(12) United States Patent
Breck et al.

(10) Patent No.: US 7,835,960 B2
(45) Date of Patent: Nov. 16, 2010

(54) SYSTEM FOR FACILITATING A TRANSACTION

(75) Inventors: Lydia Breck, New York, NY (US); Jessica Zoob, New York, NY (US); Glen Salow, Holmdel, NJ (US); Fred Bishop, Phoenix, AZ (US); William Schwarz, Scottsdale, AZ (US); Elliot Glazer, Chesterfield, VA (US); David Johnstone, Cave Creek, AZ (US); Katie Cunningham, New York, NY (US); Anant Nambiar, New Rochelle, NY (US); Jan Nunney Belt, Scottsdale, AZ (US); Martin Wittwer, New York, NY (US); David Armes, Phoenix, AZ (US); Christina Chow, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 610 days.

(21) Appl. No.: 10/709,978

(22) Filed: Jun. 10, 2004

(65) Prior Publication Data

US 2004/0210449 A1 Oct. 21, 2004

Related U.S. Application Data

(62) Division of application No. 09/800,461, filed on Mar. 7, 2001.

(60) Provisional application No. 60/187,620, filed on Mar. 7, 2000, provisional application No. 60/200,625, filed on Apr. 28, 2000, provisional application No. 60/213,323, filed on Jun. 22, 2000.

(51) Int. Cl.
*G06Q 40/00* (2006.01)

(52) U.S. Cl. ............................ 705/35; 705/42; 705/41

(58) Field of Classification Search ................... 705/35, 705/26, 39, 40, 64, 74
See application file for complete search history.

(56) References Cited

U.S. PATENT DOCUMENTS 4,303,904 A  12/1981  Chasek
4,443,027 A  4/1984  McNeely et al.

(Continued)

FOREIGN PATENT DOCUMENTS

CH          689070 A5    8/1988

(Continued)

OTHER PUBLICATIONS

Gabber et al., "Agora: A Minimal Distributed Protocol for Electronic Commerce" Nov. 18, 1996, USENIX Oakland, CA, pp. 1, 8 and 9.*

(Continued)

*Primary Examiner*—James A Kramer
*Assistant Examiner*—James A Vezeris
(74) *Attorney, Agent, or Firm*—Snell & Wilmer, L.L.P.

(57) ABSTRACT

The present invention provides a system and method for facilitating a transaction using a secondary transaction number that is associated with a cardholder's primary account. The cardholder provides the secondary transaction number, often with limited-use conditions associated therewith, to a merchant to facilitate a more secure and confident transaction.

12 Claims, 15 Drawing Sheets

U.S. PATENT DOCUMENTS

| | | | |
|---|---|---|---|
| 4,450,535 A | 5/1984 | dePommery et al. |
| 4,475,308 A | 10/1984 | Heise et al. |
| 4,583,766 A | 4/1986 | Wessel |
| 4,639,765 A | 1/1987 | D'Hont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik et al. |
| 5,239,654 A | 8/1993 | Ing-Simmons et al. |
| 5,247,304 A | 9/1993 | D'Hont |
| 5,274,392 A | 12/1993 | D'Hont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schuermann et al. |
| 5,350,906 A | 9/1994 | Brody et al. |
| 5,351,052 A | 9/1994 | D'Hont et al. |
| 5,365,551 A | 11/1994 | Snodgrass et al. |
| 5,371,896 A | 12/1994 | Gove et al. |
| 5,373,303 A | 12/1994 | D'Hont |
| 5,397,881 A | 3/1995 | Mannik |
| 5,407,893 A | 4/1995 | Koshizuka et al. |
| 5,408,243 A | 4/1995 | D'Hont |
| 5,410,649 A | 4/1995 | Gove |
| 5,428,363 A | 6/1995 | D'Hont |
| 5,453,601 A * | 9/1995 | Rosen ................. 705/65 |
| 5,453,747 A | 9/1995 | D'Hont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | D'Hont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | D'Hont |
| 5,500,513 A | 3/1996 | Langhans et al. |
| 5,500,651 A | 3/1996 | Schuermann |
| 5,504,808 A | 4/1996 | Hamrick, Jr. |
| 5,513,525 A | 5/1996 | Schuermann |
| 5,519,381 A | 5/1996 | Marsh |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A | 8/1996 | Mandelbaum |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | D'Hont |
| 5,557,516 A | 9/1996 | Hogan |
| 5,561,430 A | 10/1996 | Knebelkamp |
| 5,563,582 A | 10/1996 | D'Hont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A | 11/1996 | Taylor |
| 5,581,630 A | 12/1996 | Bonneau, Jr. |
| 5,585,787 A | 12/1996 | Wallerstein |
| 5,590,038 A | 12/1996 | Pitroda |
| 5,592,150 A | 1/1997 | D'Hont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | D'Hont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujiola |
| 5,606,520 A | 2/1997 | Gove et al. |
| 5,606,594 A | 2/1997 | Register |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | D'Hont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | D'Hont |
| 5,625,370 A | 4/1997 | D'Hont |
| 5,625,695 A | 4/1997 | M'Raihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle et al. |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers et al. |
| 5,691,731 A | 11/1997 | van Erven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A | 2/1998 | Deo et al. |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | D'Hont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | D'Hont |

| | | | | | |
|---|---|---|---|---|---|
| 5,748,737 A | 5/1998 | Daggar | 5,917,168 A | 6/1999 | Nakamura et al. |
| 5,758,195 A | 5/1998 | Balmer | 5,918,216 A | 6/1999 | Miksovsky et al. |
| 5,761,306 A | 6/1998 | Lewis | 5,920,628 A | 7/1999 | Indeck et al. |
| 5,761,493 A | 6/1998 | Blakeley et al. | 5,923,734 A | 7/1999 | Taskett |
| 5,768,385 A | 6/1998 | Simon | 5,929,801 A | 7/1999 | Aslanidis et al. |
| 5,768,609 A | 6/1998 | Gove et al. | 5,930,767 A | 7/1999 | Reber et al. |
| 5,770,843 A | 6/1998 | Rose et al. | 5,930,777 A | 7/1999 | Barber |
| 5,774,882 A | 6/1998 | Keen et al. | 5,931,917 A | 8/1999 | Nguyen et al. |
| 5,777,903 A | 7/1998 | Piosenka et al. | 5,933,624 A | 8/1999 | Balmer |
| 5,778,067 A | 7/1998 | Jones et al. | 5,943,624 A | 8/1999 | Fox et al. |
| 5,778,069 A | 7/1998 | Thomlinson et al. | 5,948,116 A | 9/1999 | Aslanidis et al. |
| 5,785,680 A | 7/1998 | Niezink et al. | 5,949,044 A | 9/1999 | Walker et al. |
| 5,792,337 A | 8/1998 | Padovani et al. | 5,949,876 A | 9/1999 | Ginter et al. |
| 5,793,324 A | 8/1998 | Aslanidis et al. | 5,953,512 A | 9/1999 | Cai et al. |
| 5,794,095 A | 8/1998 | Thompson | 5,953,710 A | 9/1999 | Fleming |
| 5,797,060 A | 8/1998 | Thompson | 5,955,717 A | 9/1999 | Vanstone |
| 5,797,085 A | 8/1998 | Beuk et al. | 5,955,969 A | 9/1999 | D'Hont |
| 5,797,133 A | 8/1998 | Jones et al. | 5,956,024 A | 9/1999 | Strickland et al. |
| 5,798,709 A | 8/1998 | Flaxl | 5,956,699 A | 9/1999 | Wong et al. |
| 5,809,142 A | 9/1998 | Hurta et al. | 5,958,004 A | 9/1999 | Helland et al. |
| 5,809,288 A | 9/1998 | Balmer | 5,960,411 A | 9/1999 | Hartman et al. |
| 5,809,633 A | 9/1998 | Mundigl et al. | 5,963,915 A | 10/1999 | Kirsch |
| 5,825,007 A | 10/1998 | Jesadanont | 5,963,924 A | 10/1999 | Williams et al. |
| 5,825,302 A | 10/1998 | Stafford | 5,966,697 A | 10/1999 | Fergerson et al. |
| 5,826,077 A | 10/1998 | Blakeley et al. | 5,970,148 A | 10/1999 | Meier |
| 5,826,241 A * | 10/1998 | Stein et al. .................. 705/26 | 5,970,471 A | 10/1999 | Hill |
| 5,826,242 A | 10/1998 | Montulli | 5,970,472 A | 10/1999 | Allsop et al. |
| 5,826,243 A | 10/1998 | Musmanno et al. | 5,970,473 A | 10/1999 | Gerszberg et al. |
| 5,828,044 A | 10/1998 | Jun et al. | 5,970,475 A | 10/1999 | Barnes et al. |
| 5,834,756 A | 11/1998 | Gutman et al. | RE36,365 E | 11/1999 | Levine et al. |
| 5,835,894 A | 11/1998 | Adcock et al. | 5,978,840 A | 11/1999 | Nguyen et al. |
| 5,841,364 A | 11/1998 | Hagl et al. | 5,979,757 A | 11/1999 | Tracy et al. |
| 5,842,088 A | 11/1998 | Thompson | 5,982,293 A | 11/1999 | Everett et al. |
| 5,844,218 A | 12/1998 | Kawan et al. | 5,983,207 A | 11/1999 | Turk et al. |
| 5,844,230 A | 12/1998 | Lalonde | 5,983,208 A | 11/1999 | Haller et al. |
| 5,845,267 A | 12/1998 | Ronen | 5,984,180 A | 11/1999 | Albrecht |
| 5,851,149 A | 12/1998 | Xidos et al. | 5,987,140 A | 11/1999 | Rowney et al. |
| 5,852,812 A | 12/1998 | Reeder | 5,987,155 A | 11/1999 | Dunn et al. |
| 5,854,891 A | 12/1998 | Postlewaite et al. | 5,987,498 A | 11/1999 | Athing et al. |
| 5,858,006 A | 1/1999 | Van der AA et al. | 5,989,950 A | 11/1999 | Wu |
| 5,859,419 A | 1/1999 | Wynn | 5,991,413 A | 11/1999 | Arditti et al. |
| 5,859,779 A | 1/1999 | Giordano et al. | 5,991,608 A | 11/1999 | Leyten |
| 5,862,325 A | 1/1999 | Reed et al. | 5,991,748 A | 11/1999 | Taskett |
| 5,864,306 A | 1/1999 | Dwyer et al. | 5,991,750 A | 11/1999 | Watson |
| 5,864,323 A | 1/1999 | Berthon | 5,996,076 A | 11/1999 | Rowney et al. |
| 5,864,830 A | 1/1999 | Armetta et al. | 5,999,914 A | 12/1999 | Blinn et al. |
| 5,867,100 A | 2/1999 | D'Hont | 6,000,832 A | 12/1999 | Franklin et al. |
| 5,870,031 A | 2/1999 | Kaiser et al. | 6,002,438 A | 12/1999 | Hocevar et al. |
| 5,870,915 A | 2/1999 | D'Hont | 6,002,767 A | 12/1999 | Kramer |
| 5,878,138 A | 3/1999 | Yacobi | 6,003,014 A | 12/1999 | Lee et al. |
| 5,878,141 A | 3/1999 | Daly et al. | 6,005,942 A | 12/1999 | Chan et al. |
| 5,878,215 A | 3/1999 | Kling et al. | 6,006,216 A | 12/1999 | Griffin et al. |
| 5,878,337 A | 3/1999 | Joao et al. | 6,009,412 A | 12/1999 | Storey |
| 5,878,403 A | 3/1999 | DeFrancesco et al. | 6,011,487 A | 1/2000 | Plocher |
| 5,880,675 A | 3/1999 | Trautner | 6,012,039 A | 1/2000 | Hoffman et al. |
| 5,881,272 A | 3/1999 | Balmer | 6,012,049 A | 1/2000 | Kawan |
| 5,883,810 A | 3/1999 | Franklin et al. | 6,012,143 A | 1/2000 | Tanaka |
| 5,884,280 A | 3/1999 | Yoshioka et al. | 6,012,636 A | 1/2000 | Smith |
| 5,887,266 A | 3/1999 | Heinonen et al. | 6,014,634 A | 1/2000 | Scroggie et al. |
| 5,890,137 A | 3/1999 | Koreeda | 6,014,635 A | 1/2000 | Harris et al. |
| 5,897,622 A | 4/1999 | Blinn et al. | 6,014,636 A | 1/2000 | Reeder |
| 5,898,783 A | 4/1999 | Rohrbach | 6,014,645 A | 1/2000 | Cunningham |
| 5,898,838 A | 4/1999 | Wagner | 6,014,646 A | 1/2000 | Vallee et al. |
| 5,903,830 A | 5/1999 | Joao et al. | 6,014,648 A | 1/2000 | Brennan |
| 5,903,875 A | 5/1999 | Kohara | 6,014,650 A | 1/2000 | Zampese |
| 5,903,880 A | 5/1999 | Biffar | 6,014,748 A | 1/2000 | Tushie et al. |
| 5,905,798 A | 5/1999 | Nerlikar et al. | 6,016,482 A | 1/2000 | Molinari et al. |
| 5,905,908 A | 5/1999 | Wagner | 6,016,484 A | 1/2000 | Williams et al. |
| 5,909,492 A | 6/1999 | Payne et al. | 6,018,717 A | 1/2000 | Lee et al. |
| 5,912,678 A | 6/1999 | Saxena et al. | 6,018,718 A | 1/2000 | Walker et al. |
| 5,913,203 A | 6/1999 | Wong et al. | 6,021,943 A | 2/2000 | Chastain |
| 5,914,472 A | 6/1999 | Foladare et al. | 6,023,510 A | 2/2000 | Epstein |
| 5,915,023 A | 6/1999 | Bernstein | 6,024,286 A | 2/2000 | Bradley et al. |

| | | | |
|---|---|---|---|
| 6,029,147 A | 2/2000 | Horadan et al. | |
| 6,029,149 A | 2/2000 | Dykstra et al. | |
| 6,029,150 A | 2/2000 | Kravitz | |
| 6,029,890 A | 2/2000 | Austin | |
| 6,029,892 A | 2/2000 | Miyake | |
| 6,032,136 A | 2/2000 | Brake et al. | |
| 6,038,292 A | 3/2000 | Thomas | |
| 6,038,551 A | 3/2000 | Barlow et al. | |
| 6,038,584 A | 3/2000 | Balmer | |
| 6,041,308 A | 3/2000 | Walker et al. | |
| 6,044,360 A | 3/2000 | Picciallo | |
| 6,047,888 A | 4/2000 | Dethloff | |
| 6,052,675 A | 4/2000 | Checchio | |
| 6,058,418 A | 5/2000 | Kobata | |
| 6,061,344 A | 5/2000 | Wood, Jr. | |
| 6,061,789 A | 5/2000 | Hauser et al. | |
| 6,064,320 A | 5/2000 | D'Hont et al. | |
| 6,064,981 A | 5/2000 | Barni et al. | |
| 6,070,003 A | 5/2000 | Gove et al. | |
| 6,070,150 A | 5/2000 | Remington et al. | |
| 6,070,154 A | 5/2000 | Tavor et al. | |
| 6,072,870 A | 6/2000 | Nguyen et al. | |
| 6,073,840 A | 6/2000 | Marion | |
| 6,076,078 A | 6/2000 | Camp et al. | |
| 6,078,888 A | 6/2000 | Johnson, Jr. | |
| 6,078,906 A | 6/2000 | Huberman | |
| 6,078,908 A | 6/2000 | Schmitz | |
| 6,081,790 A | 6/2000 | Rosen | |
| RE36,788 E | 7/2000 | Mansvelt et al. | |
| 6,088,683 A | 7/2000 | Jalili | |
| 6,088,686 A | 7/2000 | Walker et al. | |
| 6,088,717 A | 7/2000 | Reed et al. | |
| 6,088,797 A | 7/2000 | Rosen | |
| 6,092,057 A | 7/2000 | Zimmerman et al. | |
| 6,092,198 A | 7/2000 | Lanzy et al. | |
| 6,098,053 A | 8/2000 | Slater | |
| 6,098,879 A | 8/2000 | Terranova | |
| 6,101,174 A | 8/2000 | Langston | |
| 6,102,162 A | 8/2000 | Teicher | |
| 6,102,672 A | 8/2000 | Woollenweber et al. | |
| 6,105,008 A | 8/2000 | Davis et al. | |
| 6,105,013 A | 8/2000 | Curry et al. | |
| 6,105,865 A | 8/2000 | Hardesty | |
| 6,108,641 A | 8/2000 | Kenna et al. | |
| 6,109,525 A | 8/2000 | Blomqvist et al. | |
| 6,112,152 A | 8/2000 | Tuttle | |
| 6,112,191 A | 8/2000 | Burke | |
| 6,115,360 A | 9/2000 | Quay et al. | |
| 6,115,458 A | 9/2000 | Taskett | |
| 6,116,423 A | 9/2000 | Troxtell, Jr. | |
| 6,116,505 A | 9/2000 | Withrow | |
| 6,118,189 A | 9/2000 | Flaxl | |
| 6,121,544 A | 9/2000 | Petsinger | |
| 6,122,625 A | 9/2000 | Rosen | |
| 6,123,223 A | 9/2000 | Watkins | |
| 6,125,352 A | 9/2000 | Franklin et al. | |
| 6,129,274 A | 10/2000 | Suzuki | |
| 6,133,834 A | 10/2000 | Eberth et al. | |
| 6,141,651 A | 10/2000 | Riley et al. | |
| 6,141,752 A | 10/2000 | Dancs et al. | |
| 6,163,771 A * | 12/2000 | Walker et al. | 705/18 |
| 6,167,236 A | 12/2000 | Kaiser et al. | |
| 6,173,269 B1 | 1/2001 | Solokl et al. | |
| 6,173,272 B1 | 1/2001 | Thomas et al. | |
| 6,177,860 B1 | 1/2001 | Cromer et al. | |
| 6,179,205 B1 | 1/2001 | Sloan | |
| 6,179,206 B1 | 1/2001 | Matsumori | |
| 6,188,994 B1 | 2/2001 | Egendorf | |
| 6,189,787 B1 | 2/2001 | Dorf | |
| 6,192,255 B1 | 2/2001 | Lewis et al. | |
| 6,198,728 B1 | 3/2001 | Hulyalkar et al. | |
| 6,198,875 B1 | 3/2001 | Edenson et al. | |
| 6,202,927 B1 | 3/2001 | Bashan et al. | |
| 6,205,151 B1 | 3/2001 | Quay et al. | |
| 6,206,293 B1 | 3/2001 | Gutman et al. | |
| 6,213,390 B1 | 4/2001 | Oneda | |
| 6,215,437 B1 | 4/2001 | Schuermann et al. | |
| 6,216,219 B1 | 4/2001 | Cai et al. | |
| 6,219,439 B1 | 4/2001 | Burger | |
| 6,220,510 B1 | 4/2001 | Everett et al. | |
| 6,222,914 B1 | 4/2001 | McMullin | |
| D442,627 S | 5/2001 | Webb et al. | |
| D442,629 S | 5/2001 | Webb et al. | |
| 6,223,984 B1 | 5/2001 | Renner et al. | |
| 6,226,382 B1 | 5/2001 | M'Raihi et al. | |
| 6,227,447 B1 | 5/2001 | Campisano | |
| 6,230,270 B1 | 5/2001 | Laczko, Sr. | |
| 6,232,917 B1 | 5/2001 | Baumer et al. | |
| 6,233,683 B1 | 5/2001 | Chan et al. | |
| 6,237,848 B1 | 5/2001 | Everett | |
| 6,239,675 B1 | 5/2001 | Flaxl | |
| 6,240,187 B1 | 5/2001 | Lewis | |
| 6,248,199 B1 | 6/2001 | Smulson | |
| 6,257,486 B1 | 7/2001 | Teicher et al. | |
| 6,259,769 B1 | 7/2001 | Page et al. | |
| 6,260,026 B1 | 7/2001 | Tomida et al. | |
| 6,260,088 B1 | 7/2001 | Gove et al. | |
| 6,263,316 B1 | 7/2001 | Khan et al. | |
| 6,264,106 B1 | 7/2001 | Bridgelall | |
| 6,266,754 B1 | 7/2001 | Laczko et al. | |
| 6,267,292 B1 | 7/2001 | Walker et al. | |
| 6,269,348 B1 | 7/2001 | Pare et al. | |
| 6,273,335 B1 | 8/2001 | Sloan | |
| 6,282,522 B1 | 8/2001 | Davis et al. | |
| D447,515 S | 9/2001 | Faenza, Jr. et al. | |
| 6,286,763 B1 | 9/2001 | Reynolds et al. | |
| 6,289,324 B1 | 9/2001 | Kawan | |
| 6,293,462 B1 | 9/2001 | Gangi | |
| 6,315,193 B1 | 11/2001 | Hogan | |
| 6,315,195 B1 | 11/2001 | Ramachandran | |
| 6,317,721 B1 | 11/2001 | Hurta et al. | |
| 6,318,636 B1 | 11/2001 | Reynolds et al. | |
| 6,323,566 B1 | 11/2001 | Meier et al. | |
| 6,325,285 B1 | 12/2001 | Baratelli | |
| 6,325,293 B1 | 12/2001 | Moreno | |
| 6,326,934 B1 | 12/2001 | Kinzie | |
| 6,327,573 B1 | 12/2001 | Walker et al. | |
| 6,330,544 B1 * | 12/2001 | Walker et al. | 705/14 |
| 6,336,095 B1 * | 1/2002 | Rosen | 705/1 |
| 6,342,844 B1 | 1/2002 | Rozin | |
| 6,353,811 B1 | 3/2002 | Weissman | |
| 6,364,208 B1 | 4/2002 | Stanford et al. | |
| 6,367,011 B1 | 4/2002 | Lee et al. | |
| 6,374,245 B1 | 4/2002 | Park | |
| 6,377,034 B1 | 4/2002 | Ivanov | |
| 6,378,073 B1 | 4/2002 | Davis et al. | |
| 6,388,533 B2 | 5/2002 | Swoboda | |
| 6,390,375 B2 | 5/2002 | Kayanakis | |
| 6,400,272 B1 | 6/2002 | Holtzman et al. | |
| 6,402,026 B1 | 6/2002 | Schwier | |
| 6,402,028 B1 | 6/2002 | Graham et al. | |
| 6,411,611 B1 | 6/2002 | van der Tuijn | |
| 6,415,978 B1 | 7/2002 | McAllister | |
| 6,422,464 B1 | 7/2002 | Terranova | |
| 6,422,532 B1 | 7/2002 | Garner | |
| 6,424,029 B1 | 7/2002 | Giesler | |
| RE37,822 E | 8/2002 | Anthonyson | |
| 6,427,910 B1 | 8/2002 | Barnes et al. | |
| 6,438,235 B2 | 8/2002 | Sims, III | |
| 6,439,455 B1 | 8/2002 | Everett et al. | |
| 6,445,794 B1 | 9/2002 | Shefi | |
| 6,457,996 B1 | 10/2002 | Shih | |
| 6,466,804 B1 | 10/2002 | Pecen et al. | |
| 6,473,500 B1 | 10/2002 | Risafi et al. | |
| 6,480,100 B1 | 11/2002 | Frieden et al. | |
| 6,480,101 B1 | 11/2002 | Kelly et al. | |

| | | | | | |
|---|---|---|---|---|---|
| 6,481,621 B1 | 11/2002 | Herrendoerfer et al. | 2001/0024157 A1 | 9/2001 | Hansmann et al. |
| 6,481,632 B2 | 11/2002 | Wentker et al. | 2001/0034565 A1 | 10/2001 | Leatherman |
| 6,483,427 B1 | 11/2002 | Werb | 2001/0034720 A1 | 10/2001 | Armes |
| 6,483,477 B1 | 11/2002 | Plonka | 2001/0039617 A1 | 11/2001 | Buhrlen et al. |
| 6,483,929 B1 | 11/2002 | Murakami | 2001/0049628 A1 | 12/2001 | Icho |
| 6,484,937 B1 | 11/2002 | Devaux et al. | 2002/0011519 A1 | 1/2002 | Shults, III |
| 6,490,443 B1 | 12/2002 | Freeny, Jr. | 2002/0026419 A1 | 2/2002 | Maritzen et al. |
| 6,491,229 B1 | 12/2002 | Berney | 2002/0028704 A1 | 3/2002 | Bloomfield et al. |
| 6,494,380 B2 | 12/2002 | Jarosz | 2002/0035548 A1 | 3/2002 | Hogan et al. |
| 6,507,762 B1 | 1/2003 | Amro et al. | 2002/0046341 A1 | 4/2002 | Kazaks et al. ............... 713/182 |
| 6,510,983 B2 | 1/2003 | Horowitz et al. | 2002/0052839 A1 | 5/2002 | Takatori |
| 6,510,998 B1 | 1/2003 | Stanford et al. | 2002/0062284 A1 | 5/2002 | Kawan |
| 6,513,015 B2 | 1/2003 | Ogasawara | 2002/0074398 A1 | 6/2002 | Lancos et al. |
| 6,519,565 B1 | 2/2003 | Clements et al. | 2002/0077837 A1 | 6/2002 | Krueger et al. |
| 6,520,542 B2 | 2/2003 | Thompson et al. | 2002/0077895 A1 | 6/2002 | Howell |
| 6,529,880 B1 | 3/2003 | McKeen et al. | 2002/0077992 A1 | 6/2002 | Tobin |
| 6,535,726 B1 | 3/2003 | Johnson | 2002/0079367 A1 | 6/2002 | Montani |
| 6,546,373 B1 | 4/2003 | Cerra | 2002/0092914 A1 | 7/2002 | Pentz et al. |
| 6,547,133 B1 | 4/2003 | DeVries, Jr. | 2002/0095298 A1 | 7/2002 | Ewing |
| 6,549,912 B1 | 4/2003 | Chen | 2002/0095343 A1 | 7/2002 | Barton et al. |
| 6,560,581 B1 | 5/2003 | Fox et al. | 2002/0095389 A1 | 7/2002 | Gaines |
| 6,577,229 B1 | 6/2003 | Bonneau et al. | 2002/0095587 A1 | 7/2002 | Doyle et al. |
| 6,578,768 B1 | 6/2003 | Binder et al. | 2002/0097144 A1 | 7/2002 | Collins et al. |
| 6,581,839 B1 | 6/2003 | Lasch et al. | 2002/0107007 A1 | 8/2002 | Gerson |
| 6,587,835 B1 | 7/2003 | Treyz et al. | 2002/0107742 A1 | 8/2002 | Magill |
| 6,588,660 B1 | 7/2003 | Buescher et al. | 2002/0109580 A1 | 8/2002 | Shreve et al. |
| 6,589,119 B1 | 7/2003 | Orus et al. | 2002/0111210 A1 | 8/2002 | Luciano, Jr. et al. |
| 6,598,024 B1 | 7/2003 | Walker et al. | 2002/0111917 A1 | 8/2002 | Hoffman et al. |
| 6,608,995 B1 | 8/2003 | Kawasaki et al. | 2002/0113082 A1 | 8/2002 | Leatherman et al. |
| 6,609,655 B1 | 8/2003 | Harrell | 2002/0116274 A1 | 8/2002 | Hind et al. |
| 6,623,039 B2 | 9/2003 | Thompson et al. | 2002/0120584 A1 | 8/2002 | Hogan et al. |
| 6,626,356 B2 | 9/2003 | Davenport et al. | 2002/0126010 A1 | 9/2002 | Trimble et al. |
| 6,628,961 B1 | 9/2003 | Ho et al. | 2002/0131567 A1 | 9/2002 | Maginas |
| 6,636,833 B1 * | 10/2003 | Flitcroft et al. ................. 705/1 | 2002/0138438 A1 | 9/2002 | Bardwell |
| 6,650,887 B2 | 11/2003 | McGregor et al. | 2002/0140542 A1 | 10/2002 | Prokoski et al. |
| 6,662,166 B2 | 12/2003 | Pare et al. | 2002/0145043 A1 | 10/2002 | Challa et al. |
| 6,665,405 B1 | 12/2003 | Lenstra | 2002/0147913 A1 | 10/2002 | Lun Yip |
| 6,669,086 B2 | 12/2003 | Abdi et al. | 2002/0148892 A1 | 10/2002 | Bardwell |
| 6,671,358 B1 | 12/2003 | Seidmann et al. | 2002/0152123 A1 | 10/2002 | Giordano et al. |
| 6,674,786 B1 | 1/2004 | Nakamura et al. | 2002/0154795 A1 | 10/2002 | Lee et al. |
| 6,679,427 B1 | 1/2004 | Kuroiwa | 2002/0166891 A1 | 11/2002 | Stoutenburg et al. |
| 6,681,328 B1 | 1/2004 | Harris et al. | 2002/0174067 A1 | 11/2002 | Hoffman et al. |
| 6,684,269 B2 | 1/2004 | Wagner | 2002/0176522 A1 | 11/2002 | Fan |
| 6,687,714 B1 | 2/2004 | Kogen et al. | 2002/0178063 A1 | 11/2002 | Gravelle et al. |
| 6,690,930 B1 | 2/2004 | Dupre | 2002/0178369 A1 | 11/2002 | Black |
| 6,693,513 B2 | 2/2004 | Tuttle | 2002/0185543 A1 | 12/2002 | Pentz et al. |
| 6,705,530 B2 | 3/2004 | Kiekhaefer | 2002/0188501 A1 | 12/2002 | Lefkowith |
| 6,711,262 B1 | 3/2004 | Vatanen | 2002/0190125 A1 | 12/2002 | Stockhammer |
| 6,732,936 B1 | 5/2004 | Kiekhaefer | 2002/0194303 A1 | 12/2002 | Suila et al. |
| 6,738,749 B1 * | 5/2004 | Chasko ........................ 705/17 | 2002/0194503 A1 | 12/2002 | Faith et al. |
| 6,742,120 B1 | 5/2004 | Markakis et al. | 2002/0196963 A1 | 12/2002 | Bardwell |
| 6,747,546 B1 | 6/2004 | Hikita et al. | 2003/0009382 A1 | 1/2003 | D'Arbeloff et al. |
| 6,760,581 B2 | 7/2004 | Dutta | 2003/0014307 A1 | 1/2003 | Heng |
| 6,769,718 B1 | 8/2004 | Warther et al. | 2003/0014357 A1 | 1/2003 | Chrisekos et al. |
| 6,771,981 B1 | 8/2004 | Zalewski et al. | 2003/0014891 A1 | 1/2003 | Nelms et al. |
| 6,789,012 B1 | 9/2004 | Childs et al. | 2003/0018532 A1 | 1/2003 | Dudek et al. |
| 6,834,270 B1 | 12/2004 | Pagani et al. ................ 705/65 | 2003/0018567 A1 * | 1/2003 | Flitcroft et al. ............... 705/37 |
| 6,851,617 B2 | 2/2005 | Saint et al. | 2003/0025600 A1 | 2/2003 | Blanchard |
| 6,853,087 B2 | 2/2005 | Neuhaus et al. | 2003/0028481 A1 | 2/2003 | Flitcroft et al. |
| 6,853,894 B1 | 2/2005 | Kolls | 2003/0046228 A1 | 3/2003 | Berney |
| 6,853,987 B1 | 2/2005 | Cook | 2003/0054836 A1 | 3/2003 | Michot |
| 6,857,566 B2 | 2/2005 | Wankmueller | 2003/0055727 A1 | 3/2003 | Walker et al. |
| 6,859,672 B2 | 2/2005 | Roberts et al. | 2003/0057226 A1 | 3/2003 | Long |
| 6,895,310 B1 | 5/2005 | Kolls | 2003/0057278 A1 | 3/2003 | Wong |
| 6,994,262 B1 | 2/2006 | Warther | 2003/0069828 A1 | 4/2003 | Blazey et al. |
| 7,003,501 B2 | 2/2006 | Ostroff | 2003/0069846 A1 | 4/2003 | Marcon |
| 7,069,444 B2 | 6/2006 | Lowensohn et al. | 2003/0112972 A1 | 6/2003 | Hattick et al. |
| 7,096,204 B1 | 8/2006 | Chen et al. | 2003/0120554 A1 | 6/2003 | Hogan et al. |
| 7,100,821 B2 * | 9/2006 | Rasti .......................... 235/380 | 2003/0121969 A1 | 7/2003 | Wankmueller |
| 7,103,575 B1 | 9/2006 | Linehan | 2003/0130820 A1 | 7/2003 | Lane, III |
| 7,136,835 B1 * | 11/2006 | Flitcroft et al. ............... 705/39 | 2003/0132284 A1 | 7/2003 | Reynolds et al. |
| 7,213,748 B2 | 5/2007 | Tsuei et al. | 2003/0140228 A1 | 7/2003 | Binder |
| 2001/0013542 A1 | 8/2001 | Horowitz et al. | 2003/0163699 A1 | 8/2003 | Pailles et al. |

| | | | |
|---|---|---|---|
| 2003/0167207 A1 | 9/2003 | Berardi et al. | |
| 2003/0177347 A1 | 9/2003 | Schneier et al. | |
| 2003/0183689 A1 | 10/2003 | Swift et al. | |
| 2003/0183699 A1 | 10/2003 | Masui | |
| 2003/0187786 A1 | 10/2003 | Swift et al. | |
| 2003/0187787 A1 | 10/2003 | Freund | |
| 2003/0187790 A1 | 10/2003 | Swift et al. | |
| 2003/0187796 A1 | 10/2003 | Swift et al. | |
| 2003/0195037 A1 | 10/2003 | Vuong et al. | |
| 2003/0195842 A1 | 10/2003 | Reece | |
| 2003/0195843 A1 | 10/2003 | Matsuda et al. | |
| 2003/0200184 A1 | 10/2003 | Dominguez et al. | |
| 2003/0218066 A1 | 11/2003 | Fernandes et al. | |
| 2003/0220876 A1 | 11/2003 | Burger et al. | |
| 2003/0222153 A1 | 12/2003 | Pentz et al. | |
| 2003/0225623 A1 | 12/2003 | Wankmueller | |
| 2003/0225713 A1 | 12/2003 | Atkinson et al. | |
| 2003/0227550 A1 | 12/2003 | Manico et al. | |
| 2003/0233334 A1 | 12/2003 | Smith | |
| 2004/0006539 A1* | 1/2004 | Royer et al. | 705/40 |
| 2004/0010462 A1 | 1/2004 | Moon et al. | |
| 2004/0015451 A1 | 1/2004 | Sahota et al. | |
| 2004/0016796 A1 | 1/2004 | Hann et al. | |
| 2004/0020982 A1 | 2/2004 | Hoffman et al. | |
| 2004/0029569 A1 | 2/2004 | Khan et al. | |
| 2004/0030601 A1 | 2/2004 | Pond et al. | |
| 2004/0039814 A1 | 2/2004 | Crabtree et al. | |
| 2004/0039860 A1 | 2/2004 | Mills et al. | |
| 2004/0044627 A1 | 3/2004 | Russell et al. | |
| 2004/0083184 A1* | 4/2004 | Tsuei et al. | 705/74 |
| 2004/0139021 A1 | 7/2004 | Reed et al. | |
| 2005/0017068 A1 | 1/2005 | Zalewski et al. | |
| 2005/0038718 A1 | 2/2005 | Barnes et al. | |
| 2005/0040272 A1 | 2/2005 | Argumedo et al. | |
| 2005/0119978 A1 | 6/2005 | Ates | |
| 2005/0121512 A1 | 6/2005 | Wankmueller | |

FOREIGN PATENT DOCUMENTS

| | | | |
|---|---|---|---|
| EP | 0 358 525 A2 | | 3/1990 |
| EP | 0 424 726 A1 | | 5/1991 |
| EP | 0 484 726 A1 | | 5/1992 |
| EP | 0 933 717 A2 | | 8/1999 |
| EP | 0 956 818 A1 | | 11/1999 |
| EP | 0 959 440 A2 | | 11/1999 |
| EP | 0 984 404 A2 | | 3/2000 |
| EP | 1 016 947 A2 | | 7/2000 |
| EP | 1 039 403 A2 | | 9/2000 |
| EP | 1 104 909 A2 | | 6/2001 |
| EP | 1 113 387 A2 | | 7/2001 |
| EP | 1 115 095 | | 7/2001 |
| EP | 1 199 684 A2 | | 4/2002 |
| EP | 1 251 450 A1 | | 10/2002 |
| GB | 2361790 | * | 4/2000 |
| GB | 2 347 537 A | | 9/2000 |
| JP | 2000011109 A | | 1/2000 |
| JP | 2000015288 A | | 1/2000 |
| JP | 2000040181 A | | 2/2000 |
| JP | 2000067312 A | | 3/2000 |
| JP | 2000207641 A | | 7/2000 |
| JP | 2001005931 A | | 1/2001 |
| JP | 2001283122 A | | 10/2001 |
| WO | 99/03057 A1 | | 1/1991 |
| WO | 95/32919 A1 | | 12/1995 |
| WO | 00/10144 A1 | | 2/2000 |
| WO | 00/38088 A1 | | 6/2000 |
| WO | 01/04825 A1 | | 1/2001 |
| WO | 01/15098 A1 | | 3/2001 |
| WO | 01/43095 A2 | | 6/2001 |
| WO | 01/72224 A1 | | 10/2001 |
| WO | 01/77856 A1 | | 10/2001 |
| WO | 01/80473 A2 | | 10/2001 |
| WO | 01/86535 A1 | | 11/2001 |
| WO | 01/90962 A1 | | 11/2001 |
| WO | 01/95243 A2 | | 12/2001 |
| WO | 02/01485 A1 | | 1/2002 |
| WO | 03/007623 A3 | | 1/2002 |
| WO | 02/13134 A2 | | 2/2002 |
| WO | 02/21903 A1 | | 3/2002 |
| WO | 02/063545 A2 | | 8/2002 |
| WO | 02/065246 A3 | | 8/2002 |
| WO | 02/065404 A2 | | 8/2002 |
| WO | 02/069221 A1 | | 9/2002 |
| WO | 02/073512 A1 | | 9/2002 |
| WO | 02/086665 A2 | | 10/2002 |
| WO | 02/091281 A2 | | 11/2002 |
| WO | 02/097575 A2 | | 12/2002 |
| WO | 02/101670 A2 | | 12/2002 |

OTHER PUBLICATIONS

Lamond, "Credt Card Transactions Real World and Online" © 1996.*
http://www.palowireless.com/infotooth/tutorial/baseband.asp, Apr. 28, 2003.
http://www.palowireless.com/infotooth/tutorial/hci.asp, Apr. 28, 2003.
http://www.palowireless.com/infotooth/tutorial/Imp.asp, Apr. 28, 2003.
http://www.palowireless.com/infotooth/tutorial/k1_gap.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/whatis.asp, Apr. 28, 2003.
http://www.semiconductors.philips.com/news/content/file_878.html, Apr. 7, 2003.
Hurley et al., "Automatic Ear Recognition by Force Field Transformations", The Institution of Electrical Engineers, 2000, pp. 7/1-7/5.
International Newsletter of the TI RFID Group, 2000, Issue 20, 12 pages.
International Search Report and Written Opinion of the International Searching Authority, PCT/US05/26101, May 13, 2008.
Kaplan, Jeremy A., "Networking: Microsoft SPOT", http://www.pcmag.com/print_article/0,3048,a=43561,00.asp, Jul. 1, 2003, 2 pages.
Korotkaya, "Biometric Person Authentication: Odor", Department of Information Technology, Laboratory of Applied Mathematics, Lappeenranta University of Technology, 18 pages.
Krakow, "Credit on Your Key Ring, Buy Gas at Mobil, Exxon and Soon Burgers at McDonald's", MSNBC, http://www.msnbc.msn.com/id/3072638, Feb. 17, 2004, 4 pages.
Kulkarni, et al., "Biometrics: Speaker Verification" http://biometrics.cse.msu.edu/speaker.html, Mar. 8, 2004, 5 pages.
Kuntz, Mary, "Credit Cards as Good as Gold", Forbes, Nov. 4, 1985.
Lahey, Liam, "Microsoft Bolsters Rebate Structure", Computer Dealer News, Feb. 8, 2002.
Prophecy Central Update #9, http://www.bible.-prophecy.com/pcu9.htm, Oct. 10, 1997, 5 pages.
RFID Smart Card Gain Ground: The convenience of contactless transactions is driving widespread adoption of contactless smart "cards", RFID Journal, Apr. 9, 2003.
Roberti, "TI Embraces Prox Card Standard", http://www.ti.com/tiris/docs/news/in_the_news/2003/3-6-03.shtml, Mar. 6, 2003, 2 pages.
Rohde, "Microsoft, IBM and Phillips Test RFID Technology", IDG New Service, http://www.computerweekly.com/Article127889.htm, Feb. 9, 2004, 3 pages.
Ross et al., "Biometrics: Hand Geometry", http://biometrics.cse.msu.msu.edu/hand_geometry.html, Feb. 26, 2004, 2 pages.
Schmuckler, Eric, "Playing Your Cards Right", Forbes, Dec. 28, 1987.

Sharp, Ken, Senior Technical Editor, "Physical Reality: A Second Look", http://www.idsystems.com/reader/1999-03/phys0399_pt2/phys0399_pt2.htm.

Shim, Richard, "Microsoft: See SPOT Run On Your Wrist", http://news.com/2100-1041_3-1013442.html?tag=fd_top, Jun. 5, 2003, 1 page.

Sony, Philips to Test RFID Platform, RFID Journal, May 8, 2003, 2 pages.

Wilson, "Putting Their Finger on It", http://sanfrancisco.bizjournals.com/sanfrancisco/stories/2003/10/20/story6.html?t=printable, Feb. 9, 2004, 2 pages.

"Core One Credit Union—Discover the Advantage", http://coreone.org/2visa.html, Copyright 2001, (Last Visited Oct. 9, 2002).

U.S. Patent and Trademark Office; U.S. Appl. No. 10/787,716; Advisory Action dated Mar. 10, 2010.

U.S. Patent and Trademark Office; U.S. Appl. No. 10/787,716; Final Office Action dated Jan. 6, 2010.

U.S. Patent and Trademark Office; U.S. Appl. No. 10/709,977; Office Action dated Jan. 25, 2010.

"Credit Card Offer Travelers New Benefit", PR Newswire, Aug. 5, 1987.

"Fingerprint Analysis—The Basics", http://www.crimtrac.gov.au/fingerprintanalysis.htm, Feb. 18, 2004, 3 pages.

"Fingerprint Technology—Identix Inc.—Empowering Identification™—Understanding Biometrics", http://www.identix.com/newsroom/news_biometrics_finger.html, Feb. 18, 2004, 1 page.

"Identix Inc.—Empowering Identification™—Understanding Biometrics", http://www.identix.com/newsroom/news_biometrics_face.html, 1 page.

"Individual Biometric—Facial Recognition", http://ctl.ncsc.dni.us/biomet%20web/Bmfacial.html, Feb. 18, 2004, 2 pages.

"Individual Biometric—Fingerprint", http://ctl.ncsc.dni.us/biomet%20web/BMFingerprint.html, Feb. 18, 2004, 3 pages.

"Individual Biometric—Hand Geometry", http://ctl.ncsc.dni.us/biomet%20web/BMHand.html, Feb. 18, 2004, 2 pages.

"Individual Biometric—Iris Scan", http://ctl.ncsc.dni.us/biomet%20web/BMIris.html, Feb. 18, 2004, 2 pages.

"Individual Biometric—Retinal Scan", http://ctl.ncsc.dni.us/biomet%20web/BMRetinal.html, Feb. 18, 2004, 2 pages.

"Individual Biometric—Vascular Patterns", http://ctl.ncsc.dni.us/biomet%20web/BMVascular.html, Feb. 18, 2004, 1 page.

"Inside's Next-Gen Smart Card: The French company plans to introduce an RFID card that uses a 16-bit microprocessor and new encryption technology", RFID Journal, Oct. 29, 2002.

"International Biometric Group—Signature Biometrics: How it Works", http://www.ibgweb.com/reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"ISO Magnetic Strip Card Standards", http://www.cyberd.co.uk/support/technotes/isocards.htm, Feb. 9, 2004, 4 pages.

"Japan Gets Digital Ticket System: A national ticket seller and phone company are teaming up to create an electronic-ticket network", RFID Journal, Aug. 21, 2002.

"Making RFID Payments Ubiquitous: Philips and Visa want people to be able to pay for goods and services anywhere by using RFID chips embedded in phones and other devices", RFID Journal, Jun. 2, 2003.

"MasterCard to Test RFID Card: Pilot will test whether consumers, merchants and credit card issuers value "contactless" payments", RFID Journal, Dec. 20, 2002.

"Microsoft Launches Smart Personal Object Technology Initiative", Press Release from COMDEX Fall 2002, http://www.Microsoft.com/presspass/features/2002/nov02/11-17SPOT.asp, Nov. 17, 2002, 4 pages.

"Mobile Speedpass Goes Global as Mobil Singapore Rolls Out Asia's First RFID-Based Pay-At-The-Pump System", http://www.ti.com/tiris/docs/news_releases/rel12.htm, Apr. 5, 1999, Press Release.

"Multiple Frequency Transponders: volume production of dual-band FRID chips begins", Frontline Solutions, Jul. 19, 2003.

"New Evidence about Positive Three-Tier Co-pay Performance Presented at Express Scripts 2000 Outcomes Conference", PR Newswire Association, Inc., Jun. 28, 2000.

"Pay by Touch—Press Releases", http://www.paybytouch.com/press/html, Feb. 10, 2004, 3 pages.

"Paying It By Ear", The Guardian http://money.guardian.co.uk/creditanddebt/creditcards/story/0,1456,876908,00.html, Jan. 18, 2003, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 20 pages.

"Prestige Credit Cards: Those Pricey Plastics", Changing Times, Apr. 1986 version of its NTRU encryption algorithm, RFID Journal, Jun. 27, 2002.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"Smart Card Developer's Kit: Some Basic Standards for Smart Card", http://unix.be.eu.org/docs/smart-card-developer-kit/ch03/033-035.html, Feb. 9, 2004, 2 pages.

"Sony, Philips Creating RFID Link: Consumer electronics giants are jointly developing a new RFID standard for payments and for communication between devices", RFID Journal, Sep. 17, 2002.

"Speedpass Unleashed", http://www.cardweb.com/cardtrak/news/cf2_20a_97/html, Jun. 4, 2002, 2 pages.

"The Chase Manhattan Bank Today Announced a Comprehensive Program to Enhance the Value of All its Credit Cards", PR Newswire, Dec. 18, 1986.

"The Henry Classification System", International Biometric Group, 7 pages.

"TI Embraces Prox Card Standard: Texas instrument's ISO 14443 payment platform promises faster data transfer rates and more security", RFID Journal, Mar. 6, 2003.

"Vendors Target Amusement Parks: Protecting children and enabling cashless payments make RFID an appealing option for the entertainment industry", RFID Journal, Nov. 27, 2002.

"What's New: Timex Watch Features Speedpass System", http://www.speedpass.com/news/article.jsp?id=51, 1 page.

Bank Extends RFID Payment Pilot: Bank of America will continue to test its QuickWave RFID payment card for another three months, RFID Journal, Jan. 23, 2003.

Bonsor, "How Facial Recognition Systems Work", http://computer.howstuffworks.com/facial-recognition.htm/printable, Feb. 18, 2004, 6 pages.

Bowman, "Everything You Need to Know About Biometrics", Identix Corporation, Jan. 2008, 8 pages.

Brewin, Bob, "Magic Wands' to Speed Mobile Sales", http://www.computerworld.com/mobiletopics/mobile/story/1,10801,563300.html, Jan. 15, 2001.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Docmemory, RFID Takes Priority With Wal-Mart, http://www.simmtester.com/page/news/shownews.asp?num=6650, Feb. 9, 2004, 2 pages.

Evers, "Judge Dismisses FTC Suite Against Rambus", IDG New Service, http://www.infoworld.com/article/04/02/18/HNjudgedismisses_1.html, Feb. 18, 2004, 3 pages.

Functional Specification, Standard Card IC MF1 1C S 50, Philips Semiconductors, Product Specification Re. 5.1, May 2001.

Goldwasser, Joan, "Best of the Cash-back Cards", Kiplinger's Personal Finance Magazine, Apr. 1999.

Harris, "How Fingerprint Scanners Work", http://computer.howstuffworks.com/fingerprint-scanner.htm/printable, Feb. 18, 2004, 6 pages.

http://www.palowireless.com/infotooth/tutorial.asp, Apr. 28, 2003.

http://www.palowireless.com/infotooth/tutorial/l2cap.asp, Apr. 28, 2003.

Luettin, "Visual Speech and Speaker Recognition", http://herens.idiap.ch/~luettin/luettin-thesis.bib.abs.html, Jun. 30, 2000, 1 page.

McPerson, "The Evolution of Mobile Payment", Financial Insights, http://www.banktech.com/story/news/showArticle.jhtml?articleID=17601432, Feb. 2, 2004, 2 pages.

Niccolai, James, "CES: Microsoft's SPOT Technology has Humble Origins", http://archive.inforworld.com/articles/hn/xml/03/01/10/030110hnspot.xml?s=IDGNS, Jan. 10, 2003, 3 pages.

Nyman, Judy, "Free Income Tax Clinics are Opening as Apr. 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

Pay by Touch—Company, http://www.paybytouch.com/company.html.

International Search Report and Written Opinion of the International Searching Authority, PCT/US05/26067, May 23, 2007.

* cited by examiner

```
ARZPP   PRIVATE PAYMENT INQUIRY                    S-TSC6-03  09/26/00
ACCT:  0000 000000 00000  AMT:           MONTH:    YEAR:
                                         PLASTIC NO:

PRIVATE PAYMENT NO    EXP DT       CHG DT        CHARGE AMT   MAG SEQ NO CTR
0000 001111 11111     2000-09-30   09/09/2000         48.59              PP
MERCHANT A
0000 002222 22222     2000-09-30   09/09/2000         59.00              SC
MERCHANT B

END OF DETAIL
```

FIG. 12

SYSTEM FOR FACILITATING A TRANSACTION

CROSS REFERENCE TO RELATED APPLICATIONS

This application claims priority to, and the benefit of, U.S. Ser. No. 09/800,461, filed on Mar. 7, 2001 by the same inventors and with the same title, which itself claims priority to U.S. provisional applications: (1) Ser. No. 60/187,620, filed Mar. 7, 2000, (2) Ser. No. 60/200,625, filed Apr. 28, 2000, and (3) Ser. No. 60/213,323, filed Jun. 22, 2000, all of which are hereby incorporated by reference.

FIELD OF INVENTION

The present invention generally relates to a system for facilitating transactions utilizing a secondary transaction number that is associated with a primary transaction card. More particularly, the system allows a cardholder to pay a merchant with a private, limited-use, transaction number without the need to disclose to the merchant or others the cardholder's primary charge card number. Moreover, the present invention provides registration, number generation and association, authorization, settlement and customer service processes that achieve an improved secure and private transaction system.

BACKGROUND OF INVENTION

The proliferation of the Internet has resulted in a thriving electronic commerce industry, where more and more products and services are available to consumers in a variety of non-traditional ways, e.g., internet, telephone sales, wireless, interactive TV, etc. For example, in traditional online consumer-merchant transactions, consumers typically provide merchants with transaction numbers (e.g., charge card numbers) from their existing debit, phone, credit or other transaction/service cards (e.g., American Express®, VISA®, MasterCard® and Discover Card®, AT&T®, MCI®, etc.). Transmission of transaction numbers via these traditional means has created increased opportunities for fraud. Namely, it is possible for these numbers to be intercepted during transmission, after transmission, while being stored electronically or at the merchant's online or offline location. In light of the increase in charge card fraud involving situations where the physical charge card is not actually presented to the merchant, consumers are becoming increasingly cautious and leery of giving out their actual charge card number to merchants (or other unknown third parties asserting to be merchants).

In traditional online purchases, a consumer often browses the Internet for items to purchase. When the consumer finds an item that he or she is interested in purchasing, the consumer typically selects an item to add to a virtual shopping cart. When the consumer has finished shopping, and desires to purchase an item, the consumer usually proceeds to a virtual checkout, where the consumer is prompted for payment and delivery information. The consumer then typically is required to enter the appropriate delivery and credit card information, where the the consumer reads the credit card number directly from the consumer's physical credit card. This information is then transmitted electronically to the merchant via a public Internet network. Although the transmission is often encrypted, there exists the possibility that the number will be intercepted en route to the merchant. More likely, however, is that the number will be fraudulently used by an unscrupulous third party, such as a dishonest employee of the merchant.

In addition to the previous example, various other means of credit card skimming are common in the industry. In an attempt to minimize these and similar problems relating to credit card fraud, banks and other credit card institutions have begun to explore various ways to provide customers with temporary transaction numbers to facilitate online transactions, where the actual credit card is not disclosed to the merchant or any other third party.

For example, U.S. Pat. No. 5,883,810 issued to Franklin, et al., which is hereby incorporated by reference, discloses a system to facilitate online commerce where a customer is able to register and sign-up for an "online commerce card." This online commerce card does not exist in physical form, but instead exists in a digital form that can be electronically configured for online commerce. The issuing bank issues the digital card to the customer in the form of a signed digital certificate binding the customer to the bank and provides the customer a software module that can be invoked when using the commerce card to conduct an online transaction. This online commerce card is assigned a permanent customer account number that resides with the issuing bank and is not given to the customer. In Franklin, when a customer desires to make an online purchase, the customer requests from the bank a transaction number that is good for a single transaction and with a limited life. This Single transaction number is provided to a merchant to complete a purchase and is then processed by the merchant for authorization and settlement, with the issuing bank substituting and re-substituting the Single transaction number and the customer account number as necessary in order to insure that the actual account number is not released to any third party.

Although the Single use transaction number disclosed by Franklin provided some improvement over the traditional online transaction methods, several problems remained. For example, Franklin's system, which requires the generation of a digitally keyed online commerce card that does not exist in the physical form, requires customers to register and use an assigned digital certificate. Furthermore, this system requires the customer to download modules to facilitate the registration and transaction processes. Although Franklin notes that the commerce card is configured to be used by the customer in one or more areas of commerce in which the customer typically employs a charge card, Franklin fails to disclose how a consumer's existing plastic credit card number could be used to facilitate transactions. Specifically, Franklin requires instead, for the cardholder to sign-up and register in advance for an online commerce card that is not the cardholder's existing physical credit card, but is a non-physical digital card. Furthermore, the Franklin Single transaction number will not work for multiple payment arrangements, i.e., where there is one purchase but multiple payment components.

Additional publications also disclose efforts to make transactions more secure, such as, for example, PCT Application, WO 99\49424, published on Sep. 30, 1999, and PCT Application WO 99\49586, published on August 24, (collectively "Orbis"), hereby incorporated by reference, which attempt to expand and improve on the use of temporary transaction numbers. Specifically, Orbis discloses the use of a limited use credit card number that is associated with a master credit card (e.g., a physical credit card).

Orbis discloses using this limited use credit card number for transactions with merchants so that the physical credit card is not disclosed to the merchant or other third parties. In Orbis, for example, the bank or credit card provider issues the cardholder a non-activated limited use credit card number that is associated with the cardholder's master credit card. In an online transaction, the cardholder activates the limited use credit card and provides that number to the merchant to complete a transaction. On presentment to the card provider for authorization, the card provider verifies, inter alia, that the conditions of use have been met. If the conditions have been met, the card provider provides the merchant with an approval code that will accompany the payment request during settlement. If, however, during the authorization process, it is determined that certain conditions of use have not been met, the card provider de-activates the limited-use card. With the limited-use credit card de-activated, the merchant will not be paid and the transaction is not able to proceed through settlement. Conversely, if the limited use number is not submitted at all for authorization, and the merchant chooses to process this transaction for settlement, settlement may later occur and the merchant may be paid, with the incumbent risk to the merchant, however, that charge-back is likely if the charge is later disputed by the cardholder.

In prior art systems, if a transaction involving a temporary number is not authorized for failing to meet certain limited-use conditions, the number is deactivated and will not be processed through settlement. In real world environments, this creates certain problems. For instance, many online or telephonic purchases are multiple payment purchases, where one product may be purchased but multiple periodic payments are used to complete the transaction. Although the consumer is usually provided with the product up front, there may be occasions where the product is not delivered until all payments have been completed. The prior art systems occasionally create situations where the temporary transaction number is deactivated at some point in the multiple payment where the merchant is not fully paid, possibly resulting in the product not being delivered to the consumer.

As previously noted, prior art systems typically use the authorization process to determine whether limited-use conditions are satisfied. The resultant comparison utilized in the authorization process is then used to update a conditions database. However, the consumer rarely knows exactly how many authorization requests will be submitted by the merchant. For example, a consumer may purchase an item online for $1000, agreeing to apply ten monthly $100 payments to complete the purchase. Initially, one employing a prior art system may think to apply a number of different limited use conditions to facilitate this transaction, e.g., one transaction for $1000, ten transactions for $100, or any combination. Additionally, different merchants may handle authorization requests in a number of different ways. A merchant may send to the card provider (i) only one authorization request for $1000; (ii) one authorization request for $1000, followed by subsequent authorization requests for each $100 payment; (iii) one authorization request for each $100 payment, or (iv) only a few periodic authorization requests. It is also common in the industry for merchants to submit pre-authorization requests followed by a subsequent request for authorization. In sum, it can be difficult for the consumer to guess exactly what method will be employed by the merchant to facilitate the authorization process.

As such, the prior art systems create situations where a temporary transaction number may be inadvertently deactivated prior to completion of the periodic payments. If, for example, the consumer only authorized one transaction, the card would be deactivated where the merchant submits one pre-authorization request, followed by a second authorization request prior to the first payment.

SUMMARY OF INVENTION

The present invention facilitates transactions between a first party (referred to herein as "cardholder") and a second party (referred to herein as "merchant") by providing the cardholder with a secondary transaction number that is associated with a cardholder's primary account, (e.g., charge card), wherein the cardholder presents or transmits the transaction number—not the primary charge card number—to the merchant to initiate a transaction.

More particularly, the system involves the process of registering a cardholder (if not already pre-registered) to participate in a transaction system; generating a secondary transaction number and issuing this number to the cardholder, where the cardholder presents this number to a merchant to complete a sales transaction; the merchant processing this secondary transaction number, similar to any other credit card number, where the number is typically presented to the credit card provider for authorization. Throughout this process, the cardholder's primary charge card number is never passed to the merchant or any other third party. Additionally, the secondary transaction number may also carry with it certain limitations-on-use conditions, where the transaction is not authorized unless these conditions are met.

In generating a secondary transaction number, upon a cardholder's request, the card provider generates a random number and associates this number with the cardholder's primary charge card account. This instantaneous and immediate generation of a random number allows for the number to be used by the cardholder immediately upon receipt. This process obviates the need for separate activation of the secondary transaction number, and minimizes the possibility that a secondary transaction number, once issued, will not be utilized because the cardholder or card provider failed to "activate" it.

During the authorization phase of the transaction process, the card provider receives the merchant's authorization request and verifies that certain limitations-on-use conditions, if any, have been satisfied. If the conditions have been satisfied, the request is approved and the card provider sends the merchant an approval code. If conditions have not been met, the request is declined. Although the request is declined, in an exemplary embodiment, the secondary transaction number is not "deactivated," and, as a result, may still continue through the payment process.

An exemplary settlement process of the present invention involves receiving a request from a merchant to be paid for a particular transaction and paying the merchant. As noted above, even a secondary transaction number that has not been authorized or that has been denied authorization by the card provider, may proceed through settlement, with the incumbent risk to the merchant that the transaction (if not accompanied by a valid approval code) may later be charged back to the merchant if the transaction is ever disputed. During the settlement process, the accounts payable system pays the merchant, referencing only the secondary transaction number. However, prior to the accounts receivable processing, the secondary transaction number is replaced with the primary account for cardholder billing. The cardholder's statement may reflect, as desired, the secondary transaction number(s), the primary account number(s), all numbers or any combination of these numbers.

The dispute handling and customer service processes of an exemplary embodiment of this invention enable customer service representatives to retrieve information and initiate customer or merchant inquiries based on the primary account number, the secondary transaction number or other transaction specific information provided by either the cardholder or the merchant. Therefore, the cardholder may provide either the primary account number or the secondary transaction number to the customer service representative to initiate a dispute. With either number, the representative is able to look-up the associated account number and account information. The system provides seamless integration of the secondary transaction number and the primary account (i.e., charge card) number to ensure that the merchant only sees statements, reports, letters, or financial adjustments bearing the secondary transaction number—not the charge card number, while the cardholder need only reference the primary charge card account. Additionally, it is through the dispute handling process that the cardholder may dispute a transaction involving, inter alia, an unauthorized use of the secondary transaction number and it is during this process that the transaction amount is charged back to the merchant. Other situations involving a merchant charge-back may include duplicate billing; service or item not received; item returned; or wrong amount billed.

Various embodiments of the present transaction system incorporate, and improve upon, existing or developing technologies, such as, for example, non-currency based programs and loyalty systems, electronic lines of credit, online banking, etc.

BRIEF DESCRIPTION OF DRAWINGS

Additional aspects of the present invention will become evident upon reviewing the non-limiting embodiments described in the specification and the claims taken in conjunction with the accompanying figures, wherein like reference numerals denote like elements.

FIG. 4 is a web page screen shot of a card provider's exemplary online registration page for a transaction system;

FIG. 6 is a web page screen shot of a card provider's exemplary online drop-down menu used to select a primary charge card in the foreground and an online merchant's payment web page in the background;

FIG. 12 is an screen shot of an exemplary transaction history report of the present invention;

DETAILED DESCRIPTION

Figure 1:
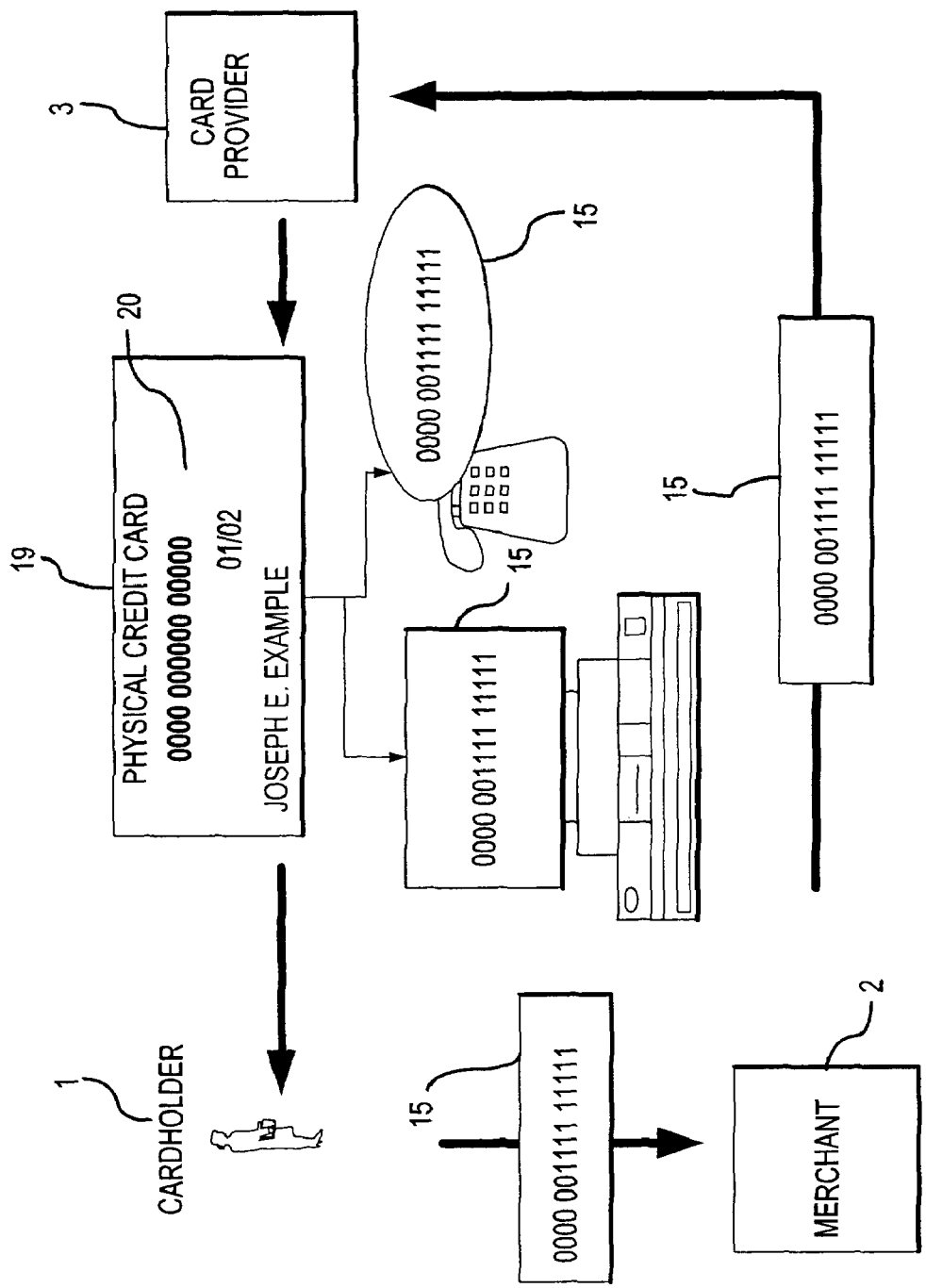
FIG. 1 is an overview of an exemplary system for facilitating a transaction.

As background, the various prior art methods for implementing transactional systems utilizing temporary numbers have failed to satisfy certain consumer demands for more secure and confident transactions. Specifically, the prior art systems have typically required, inter alia, (i) additional software to provide registration and transaction processes, (ii) the generation of a separate digital certificate embodying a non-physical online commerce card, (iii) separate activation of the temporary transaction number; or (vi) a deactivation of the temporary number if predefined conditions are not met. In short, previous transaction systems have not sufficiently adapted to real world demands for a more secure and confident transaction system that is readily compatible with existing banking and electronic commerce systems.

The present invention includes a unique system for facilitating transactions that is easily and readily adaptable to existing commercial transaction processing systems. While the system may contemplate upgrades or reconfigurations of existing processing systems, changes to cardholder or merchant systems are not necessarily required by the present invention. For example, the present system may contemplate, but does not require: downloading of software modules; a digitally-based, non-physical commerce card; activation or deactivation of the secondary transaction number; and certain embodiments do not require the existing online customer to separately register for the service. Moreover, the transaction system herein described can be seamlessly integrated into current electronic commerce processes with minimal to no changes to existing systems used by cardholders or merchants.

The transaction system of the present invention may be described herein in terms of functional block components, flow charts, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. For a basic introduction of cryptography, please review a text written by Bruce Schneider which is entitled "Applied Cryptography: Protocols, Algorithms, And Source Code In C," published by John Wiley & Sons (second edition, 1996), which is hereby incorporated by reference.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction system.

It will be appreciated, that many applications of the present invention could be formulated. One skilled in the art will appreciate that a network may include any system for exchanging data or transacting business, such as the Internet, an intranet, an extranet, WAN, LAN, satellite or wireless communications, and/or the like. The cardholder may interact with the card provider's transaction system or a merchant via any input device such as a telephone, keyboard, mouse, kiosk, personal digital assistant, touch screen, voice recognition device, transponder, biometrics device, handheld computer (e.g., Palm Pilot®), cellular phone, web TV, web phone, blue tooth/beaming device and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, or the like. Moreover, although the invention uses protocols such as TCP/IP to facilitate network communications, it will be readily understood that the invention could also be implemented using IPX, Appletalk, IP-6, NetBIOS, OSI or any number of existing or future protocols. Moreover, the system contemplates the use, sale, exchange, transfer, or any other distribution of any goods, services or information over any network having similar functionality described herein.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, flash card memory and/or the like.

Communication between the parties (e.g., cardholder, card provider, and/or merchant) to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, and/or the like. One skilled in the art will also appreciate that, for security reasons, any databases, systems, or components of the present invention may consist of any combination of databases or components at a Single location or at multiple locations, wherein each database or system includes any of various suitable security features, such as firewalls, access codes, encryption, de-encryption, compression, decompression, and/or the like.

The present invention is described below with reference to block diagrams and flowchart illustrations of methods, apparatus (e.g., systems), and computer program products according to various aspects of the invention. It will be understood that each functional block of the block diagrams and the flowchart illustrations, and combinations of functional blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Referencing the computer networked aspect of a preferred embodiment of this invention, each participant is equipped with a computing system to facilitate online commerce transactions. The computing units may be connected with each other via a data communication network. The network is a public network and assumed to be insecure and open to eavesdroppers. In the illustrated implementation, the network is embodied as the internet. In this context, the computers may or may not be connected to the internet at all times. For instance, the cardholder computer may employ a modem to occasionally connect to the internet, whereas the card provider computing center might maintain a permanent connection to the internet. It is noted that the network may be implemented as other types of networks, such as an interactive television (ITV) network.

The merchant computer and the card provider computer may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network.

As depicted in FIG. 1, the present invention generally relates to a transaction system where a first party to a transaction ("cardholder 1") provides to a second party to a transaction ("merchant 2") a secondary transaction number (STN) 15 that was generated by an issuer ("card provider 3"). In a preferred embodiment, although not required, the STN 15 is immediately usable by the cardholder 1 without need for activation and may have associated therewith cardholder 1, card provider 3, or merchant 2 defined conditions or parameters of use restrictions which limit use of the STN 15. A "transaction," as defined herein, includes, inter alia, any exchange or delivery of value, exchange or delivery of data, gifting of value or data, etc. The term "transaction" not only contemplates an exchange of goods or services for value from one party to another, but also the gifting of something from one party to another. Additionally, transaction or charge card numbers are account numbers that are used to facilitate any type of transaction.

While an exemplary embodiment of the invention is described in association with a transaction system, the invention contemplates any type of networks or transaction systems, including, for example, unsecure networks, public networks, wireless networks, closed networks, open networks, intranets, extranets, and/or the like.

The first party to the transaction (referred to herein as a "cardholder 1") is any individual, business or other entity who uses a STN 15 to facilitate any transaction. In a preferred embodiment, the cardholder 1 establishes a new or has an existing relationship or association with a card provider 3. For example, in one embodiment, a cardholder 1 may be an American Express® card member. In another embodiment, a cardholder 1 may be a participant in a frequent flyer rewards program. In a further embodiment, the cardholder 1 is a member of any suitable organization that provides transaction products or services. Another embodiment contemplates the cardholder gifting a secondary transaction number to a second party. The term cardholder 1 may also be referred to herein as "consumer," "card member," "user," "customer" or the like.

The second party to the transaction (referred to herein as a "merchant 2") is any individual, business, or other entity who receives a secondary transaction number, whether or not in exchange for goods or services. For example, in one embodiment, a merchant 2 may be an online bookstore such as Amazon.com®. In another embodiment, a merchant 2 may be a local plumber. In yet another embodiment, a merchant 2 may be a local hardware store. In some instances, the cardholder 1 and the merchant 2 may be the same. In other situations, the merchant 2 and the card provider 3 are the same. Although referred to herein as a "merchant," this term contemplates situations where any second party receives a secondary transaction number from the first party: such as, for example, where a cardholder 1 gifts a secondary transaction number to another individual (i.e., second party merchant).

The issuer ("card provider 3") includes any provider of products and/or services that facilitates any type of transaction. As contemplated by an exemplary embodiment of the present invention, the card provider 3 establishes and maintains account and/or transaction information for the cardholder 1. The card provider 3 may issue products to the cardholder 1 and may also provide both the cardholder 1 and the merchant 2 with the processes to facilitate the transaction system of the present invention. The card provider 3 includes banks; credit unions; credit, debit or other transaction-related companies, telephone companies; or any other type of card or account issuing institutions, such as card-sponsoring companies, incentive rewards companies, or third party providers under contract with financial institutions. Unless otherwise specifically set forth herein, although referred to as "card provider," this term should be understood to mean any entity issuing any type of account to facilitate any transaction, exchange or service; and should not be limited to companies possessing or issuing physical cards. In an exemplary system, the card provider 3 may be any transaction facilitating company such as a charge card provider like American Express®, VISA®, Mastercard®, Discover®, etc. In another embodiment, the card provider 3 could be any membership organization or union. In some instances, the card provider 3 and the merchant 2 may be the same, for example, where the STN 15 is issued by same entity that provides the product or service. A STN 15 phone card issued by a telephone company, where the STN 15 phone card is tied to a primary telephone account is one such occasion.

An exemplary STN 15 is any transaction number, code, symbol, indicia, etc. that is associated with another number or account that has been designated by the cardholder 1 or the card provider 3 as a primary charge card (PCC 20), i.e., primary account number. In an exemplary embodiment, the STN 15 is a purchasing number that acts as a charge card number and is associated with a PCC 20 account (e.g., a main charge card, credit, debit card or other account number, such as a bank or brokerage account, reward program account, etc.). In an exemplary embodiment, a PCC 20 account is not identified by a STN 15. In certain embodiments, the PCC 20 account may have some identifying elements related to the STN 15. The PCC 20 is defined herein to include any type of transaction card that references any account, membership, affiliation or association. When more than one cardholder 1 account exists, the PCC 20 is the account that has been designated by the cardholder 1 or the card provider 3 as the primary account. Alternatively, there may be a hierarchy of accounts where the STN 15 is associated with one or more PCCs 20 in a designated order. Additionally, as depicted in at least one embodiment described herein, a STN 15 may be associated with two or more accounts. For example, a STN 15 could be associated with a non-currency based account and also a PCC 20 account.

As shown in FIG. 1, in a preferred embodiment, the STN 15 and the PCC 20 have the same format, although additional embodiments may provide for account numbers with varying formats. In an exemplary embodiment involving credit, debit or other banking cards, the STN 15 has the same industry standard format that is used for the regular banking cards (e.g., 15 or 16 digit numbers). Preferably, the numbers are formatted such that one is unable to tell the difference between a STN 15 and a regular physical charge card. Alternatively, however, the card provider/product identifier (e.g., BIN range, first 6 digits, etc.) numbers may be different so as to differentiate the STNs from regular charge card numbers. In referencing the STN 15 and the PCC 20 number, it should be appreciated that the number may be, for example, a sixteen-digit credit card number, although each card provider has its own numbering system, such as the fifteen-digit numbering system used by American Express. Each company's card numbers comply with that company's standardized format such that a company using a sixteen-digit format will generally use four spaced sets of numbers, as represented by the number "0000 0000 0000 0000." The first five to seven digits are reserved for processing purposes and identify the issuing bank, card type etc. In this example, the last sixteenth digit is used as a sum check for the sixteen-digit number. The intermediary eight-to-ten digits are used to uniquely identify the cardholder 1. The invention contemplates the use of other numbers, indicia, codes or other security steps in addition to the use of the STN 15, but in an exemplary embodiment, only the STN 15 is provided to the merchant 2.

In a preferred embodiment, the STN 15 is randomly and instantaneously generated by the card provider 3, usually upon a cardholder's request, and can be distributed to the cardholder 1 by a variety of methods (online, telephone, wireless, email, regular mail, etc.) all of which should be secure and dependent upon verification of the cardholder's identity. Unlike the temporary transaction numbers disclosed in the prior art previously discussed, in a preferred embodiment, although not required, the STN 15 is immediately active (and usable) once it is associated with the cardholder's designated PCC 20 and provided to the cardholder 1. This feature minimizes the possibility that a merchant 2 will obtain a transaction number that will be worthless because it was not properly activated by the cardholder 1. While the present invention may contemplate a previously allocated pool of numbers that needs to be activated, an exemplary embodiment of the present invention includes STNs 15 that are instantaneously and randomly generated, and are usable upon reciept by the cardholder 1 without the need for separate activation.

In another preferred embodiment, the STN 15 may have limited-use (or conditions-of-use) parameters placed upon it by either the cardholder 1, merchant 2, or the card provider 3 in order for the numbers to be restricted for particular uses. Alternatively, the cardholder 1 is able to choose system default parameters of use. Parameters may include, for example: (i) use of the STN 15 is good for a predetermined number of transactions; (ii) cardholder-determined expiration dates (i.e., STN 15 will be generated with expiration dates that are associated but unrelated to the expiration date of the cardholder's PCC 20 number, other than that it cannot exceed the expiration date of the PCC 20 account); (iii) limiting use of the STN 15 to a specified dollar amount, dollar amount per transaction, total dollar amount for pro-designated number of transactions, maximum dollar amount per month, etc.; (iv) use of the STN 15 for a specified merchant only; (v) restricting use to a specified user, other than primary cardholder (e.g., child, spouse, gift recipient, etc.); or (vi) any combination of these or similar features, for example, a number can be used at a specified merchant only for a pro-designated number of transactions and for a maximum dollar amount. In an exemplary online embodiment, a cardholder 1 may desire to require all online transactions (e.g., purchases) be performed using only STNs, or alternatively, be performed only with specific merchants as defined. If the cardholder (or another individual) uses a physical charge card number for an online payment in violation of this condition, the card provider 3 would decline the authorization.

These parameters not only provide increased security, allowing a cardholder 1 to tailor the STN 15 to a particular use, but an ancillary benefit is the ability of a cardholder to select preferences to control spending for themselves or others who have registered eligibility to use the card (e.g., spouse, children, etc.). These preferences may include: Restrictions (cardholder 1 may choose to restrict use on certain sites or can pre-approve spending at particular sites); date range (cardholder 1 can select a period of time when transactions may occur); maximum budget amount (cardholder 1 can pre-set spending limits within certain periods of time or in certain categories (e.g. groceries, books, clothing)); credit and balance availability (cardholder 1 can check credit or demand deposit balance availability prior to transacting); non-currency based accounts, such as Reward Points as Currency (cardholder 1 can use reward points (e.g. Membership Rewards™, Blue Loot™) as currency to pay for purchases); and Gift Products (cardholder 1 can use a STN 15 to fund gift products to others for designated amounts).

Figure 2:
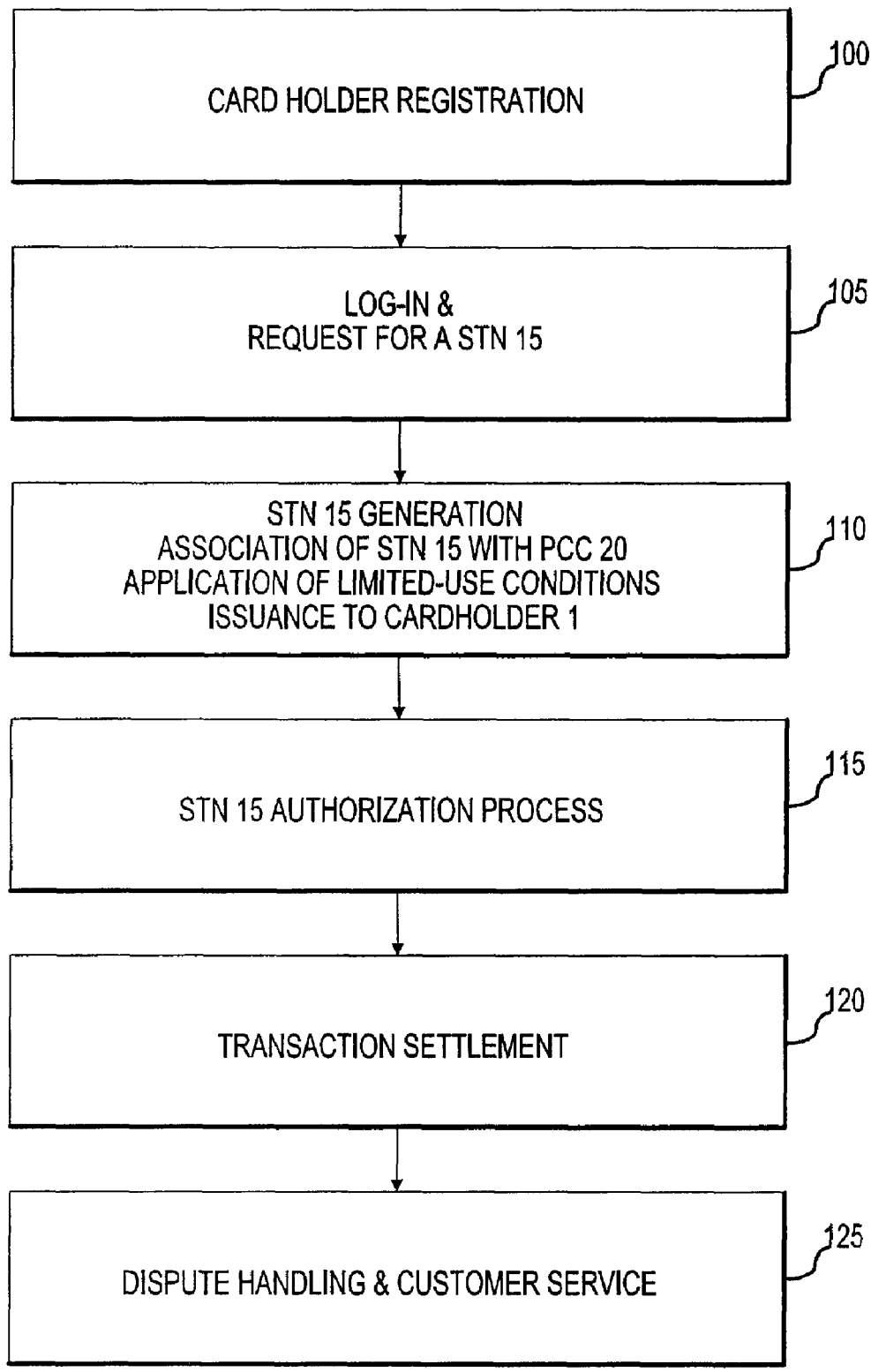
FIG. 2 is a flow diagram of exemplary processes of the present invention.

As shown in FIG. 2, an exemplary embodiment of the present invention includes steps for: (i) registering a cardholder 1 to use the card provider's 3 transaction services (step 100); (ii) receiving from a cardholder 1 a request for a STN 15 (step 105); (iii) generating a STN 15, associating the STN 15 with a PCC 20, applying limited-use conditions, if desired, and issuing the STN 15 to the cardholder 1 (step 110); (iv) processing a merchant's 2 authorization request involving the STN 15 to determine if use of the STN is authorized (step 115); (v) a settlement request, paying the merchant, and billing the cardholder 1 (step 120); and (vi) handling disputes and other customer service issues from the merchant or cardholder relating to use of the STN 15 (step 125).

Figure 8:
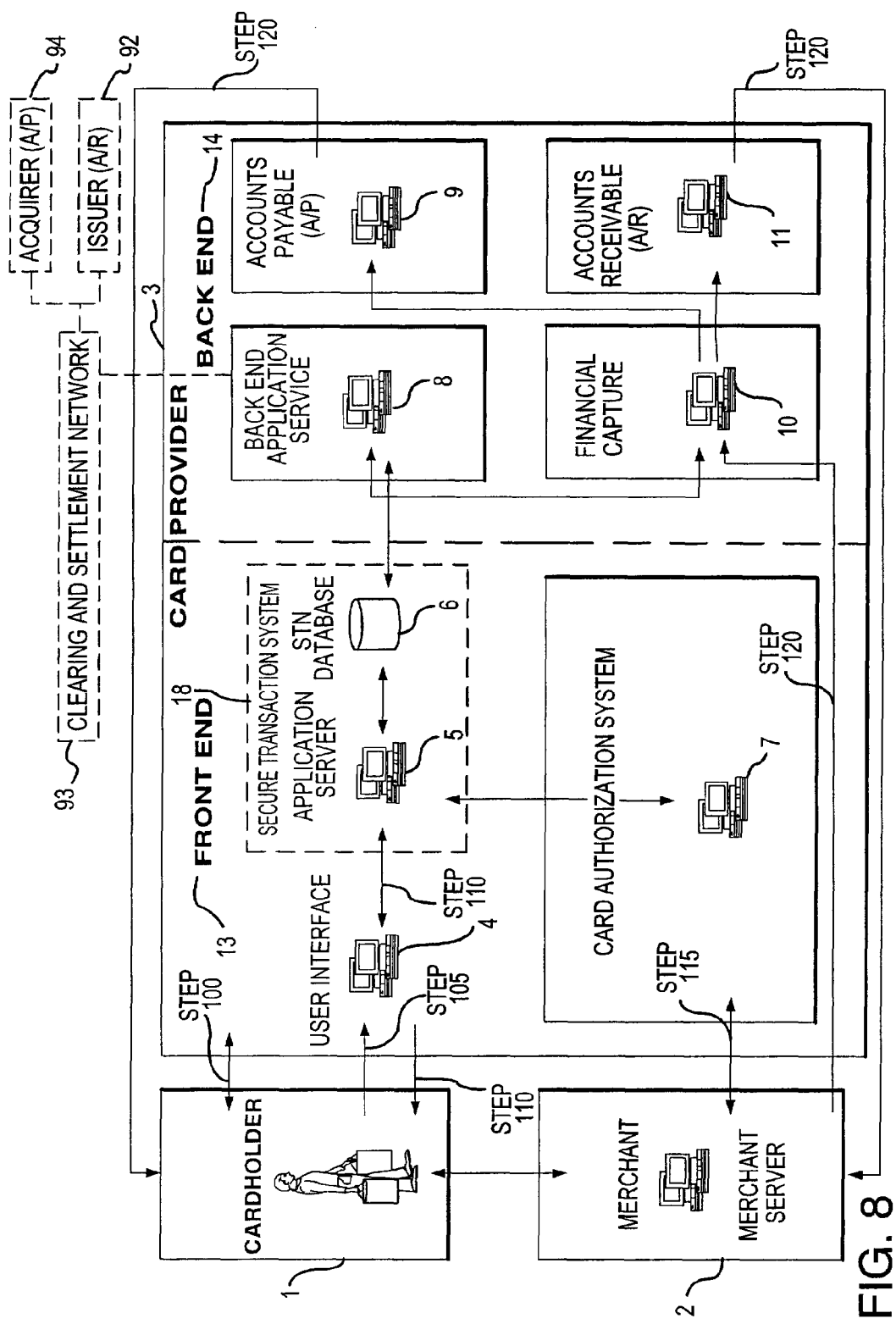
FIG. 8 is a block diagram of exemplary components of the present invention.
Figure 9:
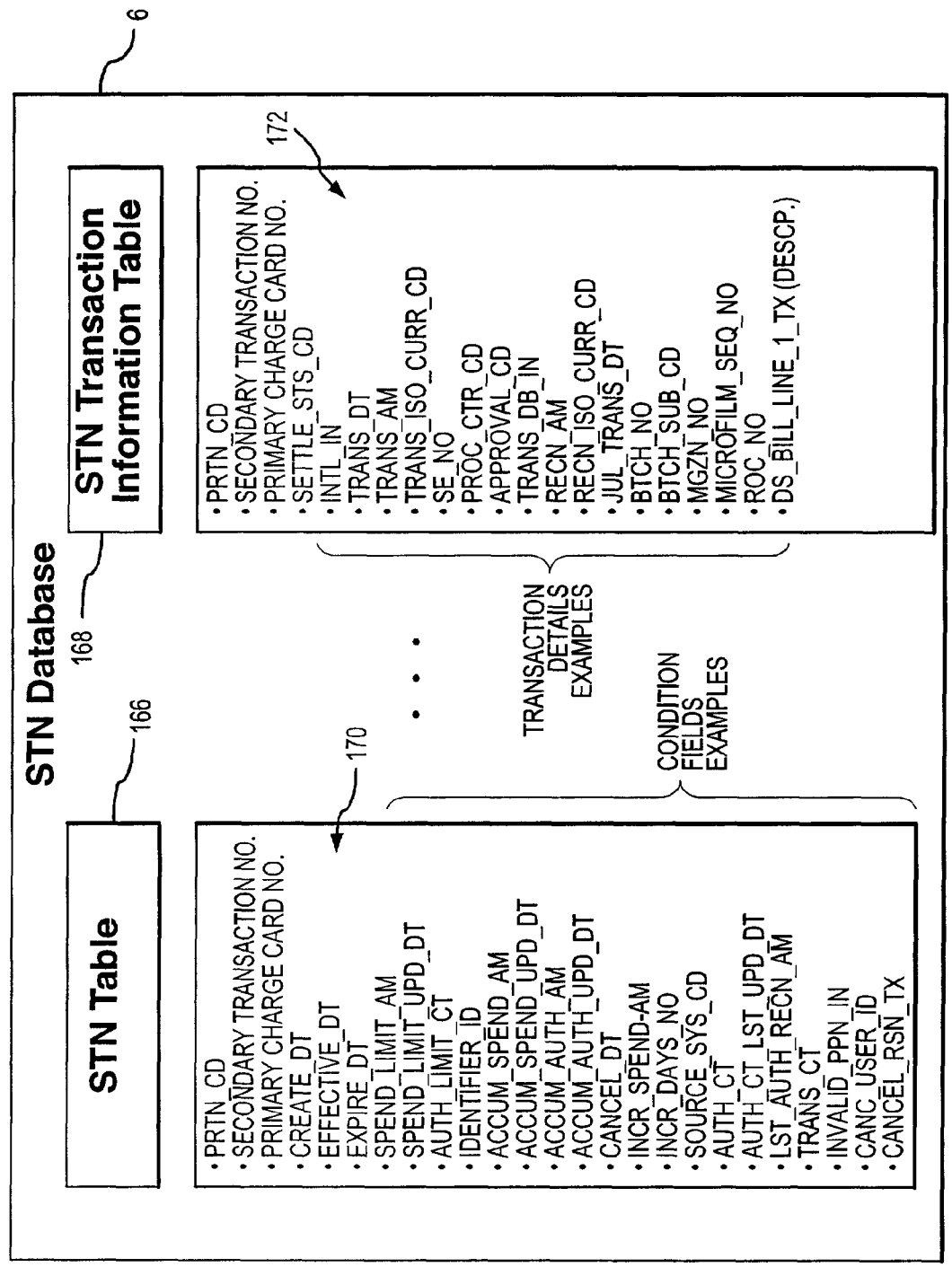
FIG. 9 is a block diagram of an example of some of the exemplary data structure of the STN database of the present invention.

FIG. 8 depicts an overview of the components of an exemplary transaction system. In general, the card provider's computer system utilizes front end 13 and backend 14 processing systems. The front end 13 system comprises, inter alia, a user interface system 4 (e.g., web server, IVR, etc), an application server 5, a STN database 6, and a card authorization system (CAS) 7. The application server 5 and STN database 6 may, at times, be referred to collectively as the STN transaction system (or service) 18. Referencing FIGS. 2 and 8, these front end 13 components facilitate (i) cardholder registration (step 100), (ii) request for a STN 15 (step 105), (ii) generation and issuance of the STN 15 (step 110), and (iv) the STN authorization process (step 115). The backend 14 system comprises, inter alia, a financial capture system 10, a back-end application service 8, an accounts payable system 9 and an accounts receivable system 11. Again referencing FIGS. 2 and 8, the backend 14 components facilitate transaction settlement (step 120). In an exemplary system, the dispute handling and customer service processes (step 125) include, inter alia, in addition to the above mentioned systems, a system for identifying a PCC 20 from a STN 15, a letter generating system for sending dispute inquiries to cardholders 1 and merchants 2, and a system that accepts incoming communication from merchants 2 and converts the STN 15 received to the PCC 20 for the purpose of facilitating the dispute handling process. More specifically, as shown in FIG. 8, the card provider 3 user interface system 4 provides the cardholder 1 with access to the card provider's transaction services. It is through this interface that the cardholder 1 may register with the card provider 3, may request a STN 15, and, in response thereto, will receive from the card provider 3 a STN 15 that is associated with his PCC 20. The front end 13 system also utilizes at least one application server 5 that processes incoming information, applies the appropriate business rules/condition sets as necessary, and generates appropriate outgoing responses. The application server 5 is configured to support interaction with, inter alia, the user interface system 4 and a STN database 6. An exemplary STN database 6 is a relational database comprising various tables for managing and translating a variety of information, such as cardholder 1 profiles, charge card data, transaction data, merchant data, conditions/rules set profiles, etc. FIG. 9 illustrates two examples of exemplary tables within the STN database 6. STN table 166 may contain a variety of database fields 170 relating to the cardholder's STN account. These fields may contain, in addition to general STN 15 and PCC 20 account information, the business rule/condition set profiles associated with use of the STN 15. A STN Transaction Information Table 168 contains database fields 172 for storing information relating to a particular transaction. As a skilled programmer can appreciate, the processing mechanisms and data structure methods can be structured in a variety of ways. In short, the user interface system 4, application server 5, and the STN database 6 are suitably connected to facilitate the generation and issuance of a STN 15 and are further associated with a card authorization system (CAS) 7, in order to process from the merchant 2 an authorization request involving a STN 15.

When processing a merchant's request for settlement, i.e., to be paid for a transaction, the financial capture (FINCAP) 10 system receives and captures the financial information (e.g., transaction amount, date, merchant identification (SE) number, STN 15, etc.). The back end application service 8 interfaces with the STN transaction system 18, as necessary, to determine if the number is a valid STN 15 (i.e., not a phony number). If the STN 15 is valid, the AP system 9 pays the merchant 2. The STN database 6 is updated to reflect the transaction information. The STN transaction system 18 (or alternatively the backend application service 8) substitutes the PCC 20 number for the STN 15 and forwards to the AR system 11 for billing.

Figure 11:
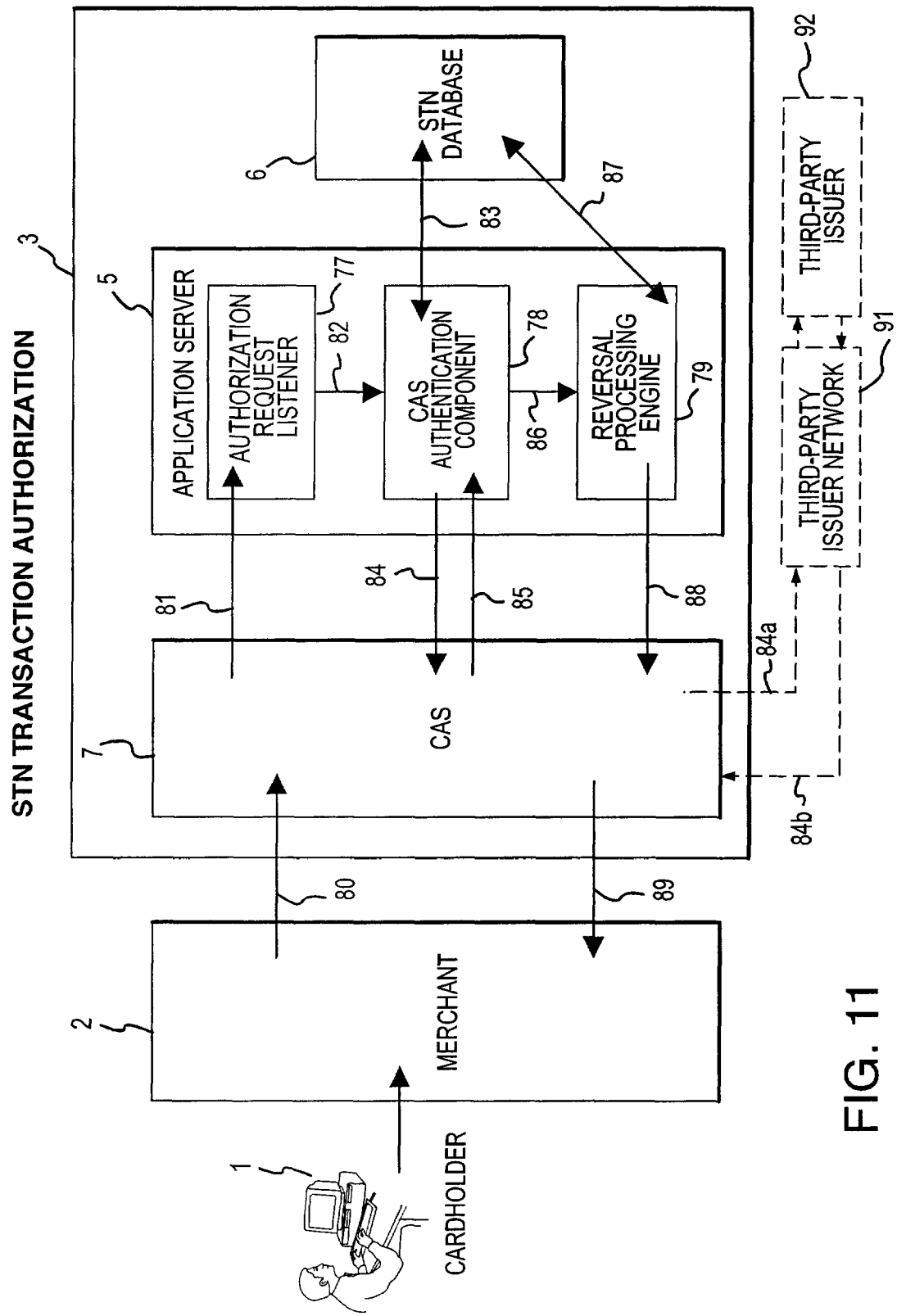
FIG. 11 is a flow diagram of an exemplary transaction authorization phase of the present invention.

Although the present system for facilitating transactions may exist within one card provider system, exemplary embodiments contemplate use with other third party authorization and settlement systems and networks. FIGS. 8 and 11, for example, depict third party authorization networks (FIGS. 11, 91 and 92) and settlement networks (FIG. 8, 93-95) that may be integrated to form parts and/or processes of the present invention.

Exemplary processes of the present invention are discussed in greater detail below.

Figure 3:
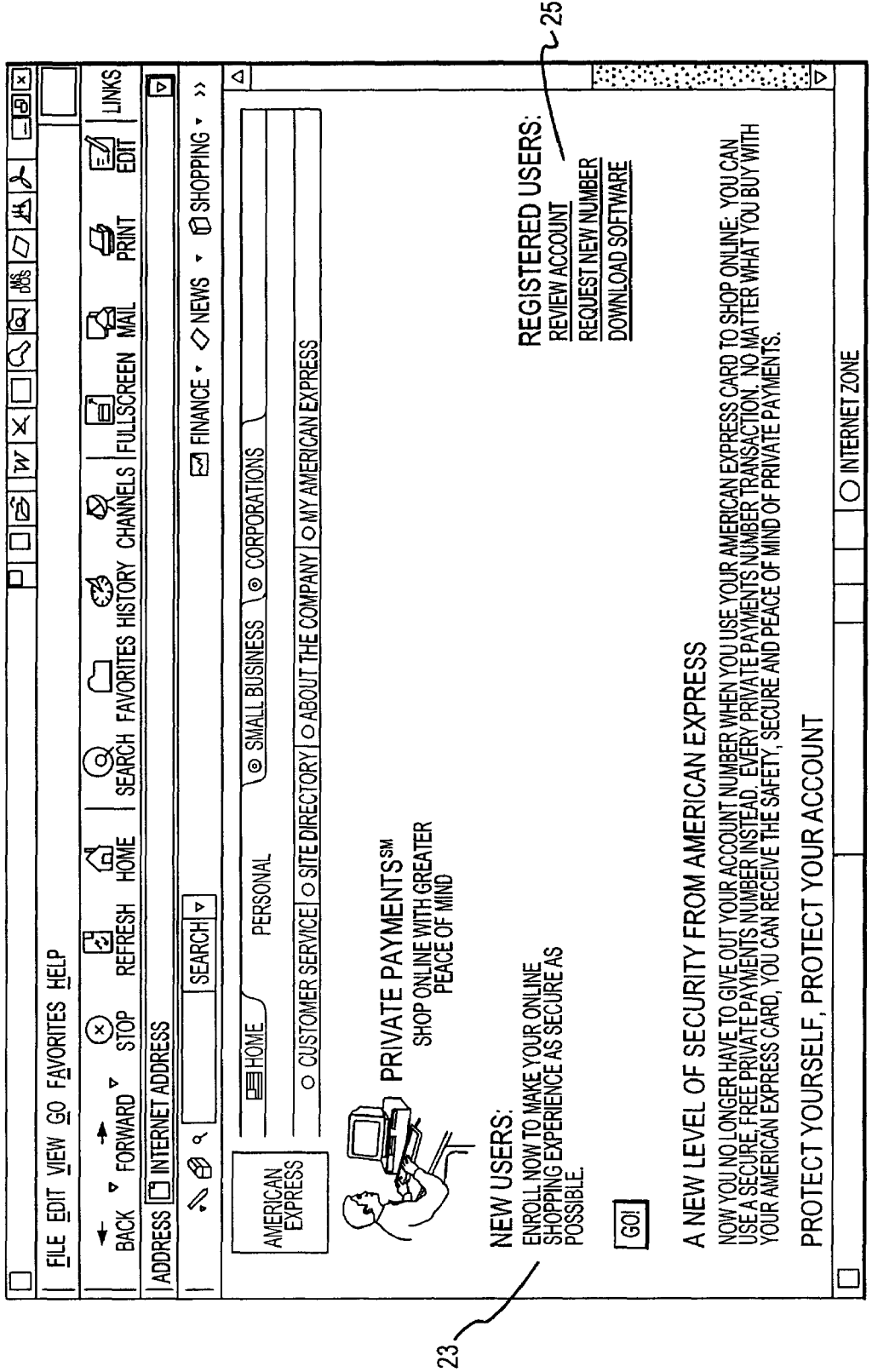
FIG. 3 is a web page screen shot of a card provider's exemplary splash page for a transaction system.
Figure 4:
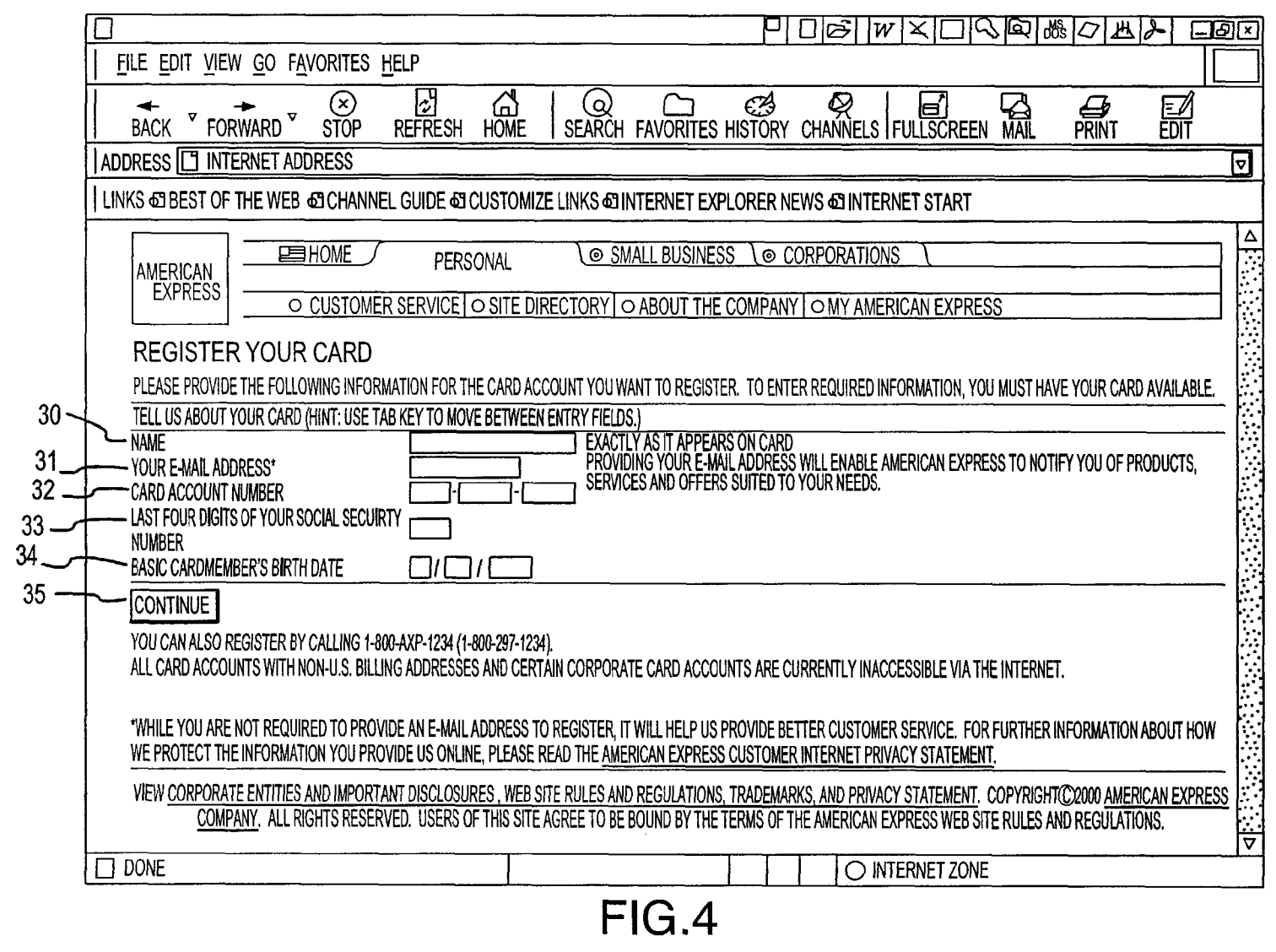

Two exemplary screen shots relating to an exemplary registration process are shown at FIGS. 3 and 4. FIG. 3 depicts a splash page for an American Express® Private Payments program. The Private Payments program is an exemplary embodiment of the present invention. Here, a new user 23 may enroll to use the program or an existing user may access a number of program features 25, e.g., review account, request a new STN 15 number or download software. The cardholder 1 generally enters this site by entering an appropriate card provider URL into her browser, by clicking on a link provided by a merchant's website, or alternatively, by an automatic pop-up feature that may appear upon recognizing particular URL or HTML codes.

To enroll (or register), the cardholder 1 is linked to a registration page (FIG. 4) and prompted for information. Information may include the cardholders name 30, email address 31, card account number 32 (e.g., PCC 20), last four digits of social security number 33, cardholder's date of birth 34, etc. Any suitable authenticating information will suffice. By selecting "continue," the cardholder 1 is provided with a username and password, or preferably, the cardholder is allowed to select her own username and password. The user interface system 4 processes this information and suitably interfaces with the STN transaction system 18 (FIG. 8) to register the cardholder. As one of skill in this art will appreciate, registration may take many forms and may be accomplished in a variety of ways. For example, a card provider 3 may choose to automatically enroll all new charge card applicants and return to the cardholder a username and password with the physical credit card. Although FIGS. 3 and 4 show an online registration process, it should be appreciated that this process may take place via any suitable user interface system.

In one embodiment, during the registration process, the cardholder 1 may choose to select or define various parameters, preferences, and programs to tailor the transaction system to the cardholder's particular needs. Additional embodiments allow the cardholder 1 to select or define parameters, preferences or programs at any point in the transaction process. In other words, the cardholder 1 has the flexibility to select parameters each time (e.g., during registration, log-in, upon STN request, etc.) a STN 15 is generated or may apply universal parameters to every STN 15 generated. With these selections, for example, the cardholder 1 may (i) designate a specific credit card to function as the primary charge card number; (ii) associate the transaction system with other programs such as a non-currency based membership rewards program, an online digital wallet, an online shopping gateway (e.g., American Express's "ShopAMEX"), an online gift check program (e.g. E-Gift), preferred buyer's programs, etc.; (iii) provide password protected access to family members; (iv) a smartcard feature allowing remote random generation of secondary transaction numbers; (v) designate cell phone, email or pager numbers to utilize with the voice or automated response secondary transaction number generation feature; (vi) and other banking and transaction features that may be apparent to those skilled in the art. For more information on loyalty systems, transaction systems, electronic commerce systems and digital wallet systems, see, for example, the Shop AMEX™ system as disclosed in Ser. No. 60/230,190 filed Sep. 5, 2000; the MR as Currency™ System disclosed in Ser. No. 60/200,492 filed Apr. 28, 2000, and Ser. No. 60/201,114 filed May 2, 2000; Wireless MR as disclosed in Ser. No. 60/192,197,296 filed on Apr. 14, 2000; a digital wallet system disclosed in U.S. Ser. No. 09/652,899 filed Aug. 31, 2000; a stored value card as disclosed in Ser. No. 09/241,188 filed on Feb. 1, 1999, all of which are herein incorporated by reference.

Figure 5:
FIG. 5 is a web page screen shot of a card provider's exemplary online log-in page for a transaction system.
Figure 6:
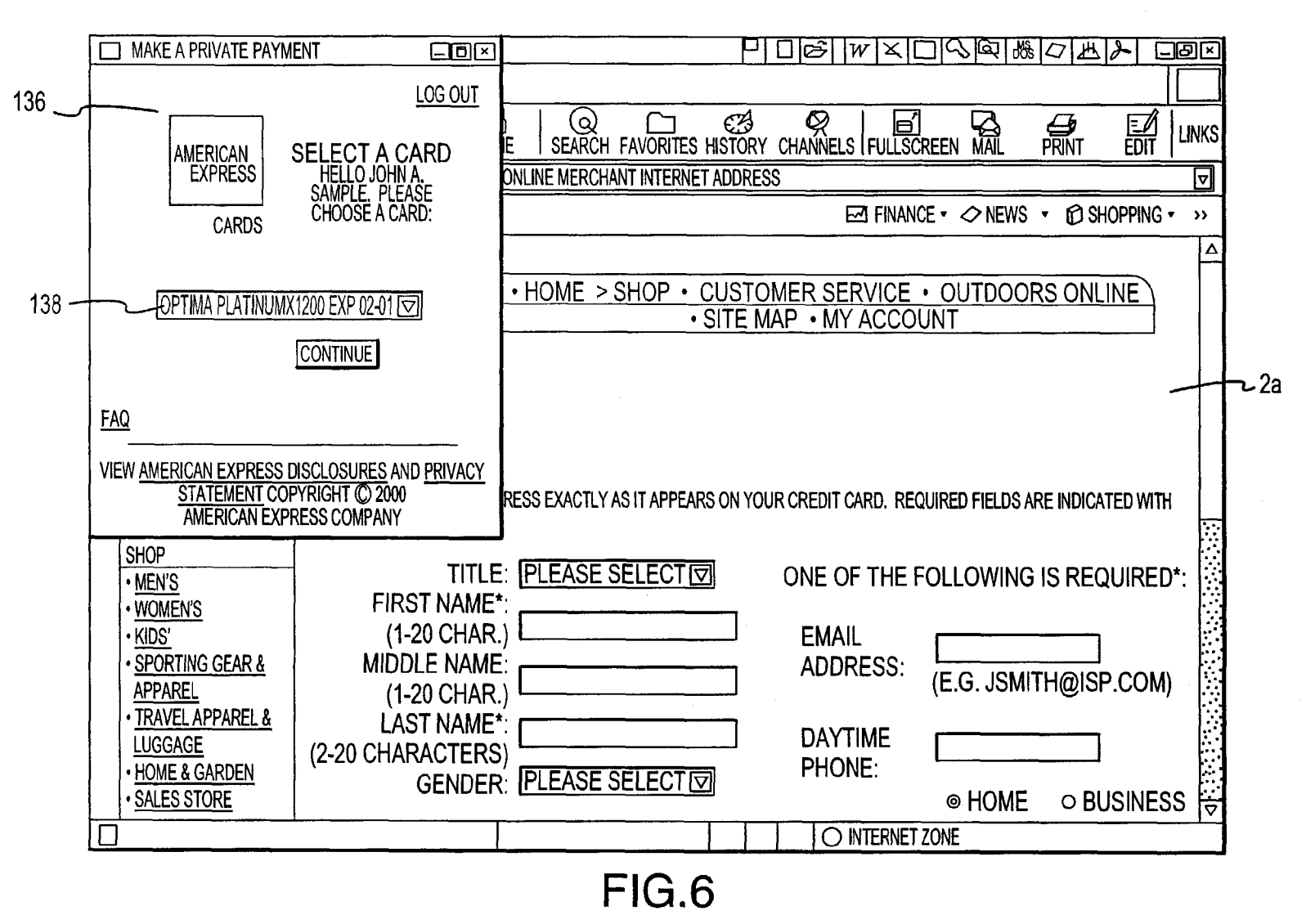

A registered cardholder 1 generally accesses the card provider's transaction system by logging into the system via any suitable user interface system 4. FIG. 5 depicts an exemplary online log-in screen 130, where the cardholder 1 is prompted for authenticating information such as a username 132 and password 134. Alternative systems contemplate authentication via any suitable user interface system. For example, an embodiment employing a portable data device such as a smart card facilitates authentication by swiping the smart card through a smart card reader and providing the appropriate PIN. After entering the appropriate authenticating information and clicking the log in button 135, the information is routed through the user interface system 4 (e.g., web server) to the application server 5, where, as shown in FIG. 5, the application server 5 retrieves information relating to the cardholder's account from the STN database 6. If the cardholder 1 has registered multiple charge card accounts, in one embodiment 136, as depicted in FIG. 6, the program prompts the cardholder 1 to choose from a list of accounts from a pull-down menu 138. The cardholder 1 then selects ~ least one account to be the primary account or to be included in a primary group of accounts (when it is desired for the STN 15 to be associated with more than one account). In other embodiments, the user interface system 4 (e.g., web server) will return additional options for the cardholder 1, such as prompting the cardholder 1 to choose from several condition fields such as those previously mentioned (e.g., restricting use to a particular merchant, amount, allowing use by other recipients, etc.).

Figure 7:
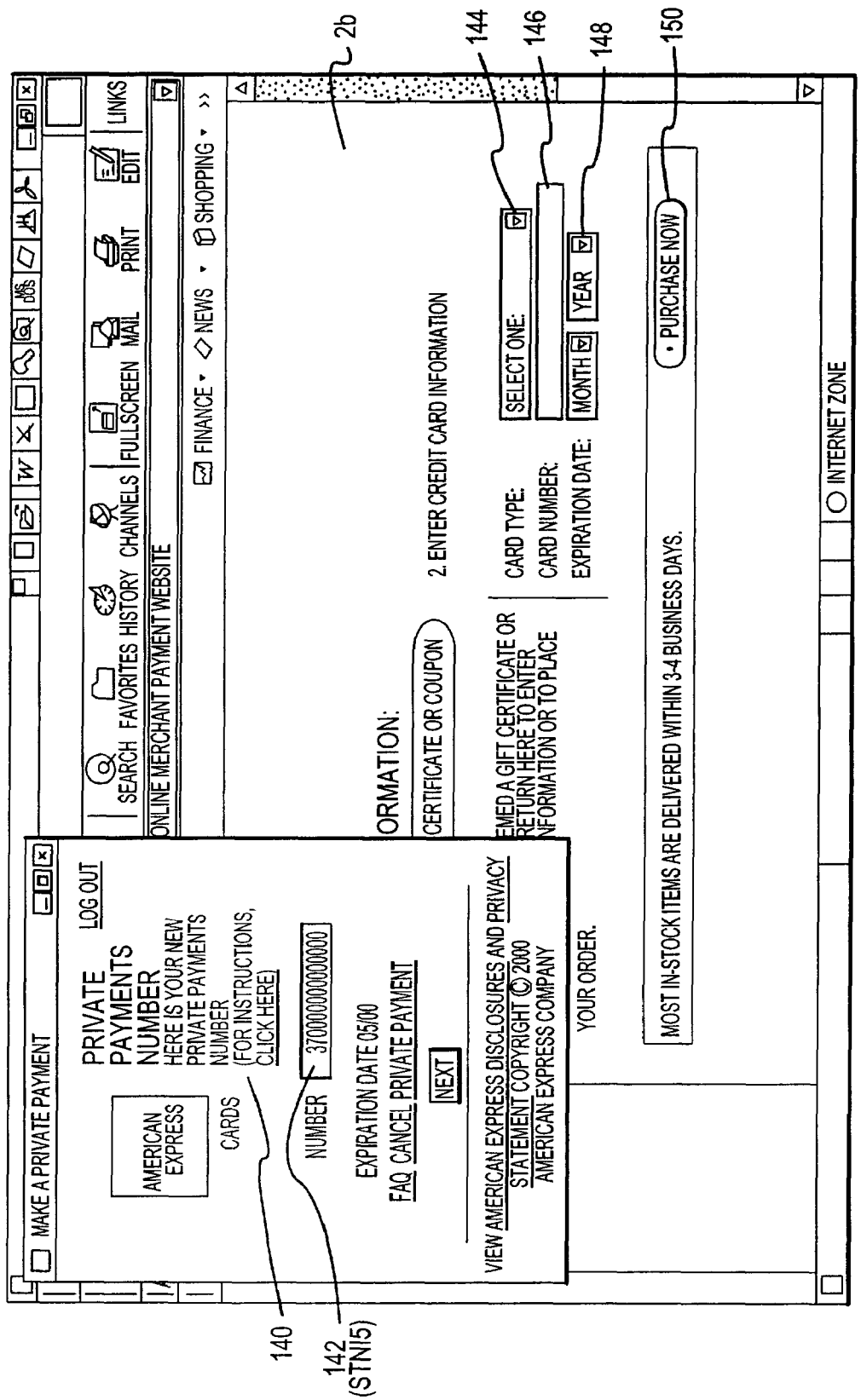
FIG. 7 is a web page screen shot, displaying in the foreground, an exemplary secondary transaction number (e.g., Private Payments™ number) returned to the user; and in the background, a merchant's payment web page.

An exemplary online transaction process begins with a cardholder 1 desiring to purchase products or services from an online merchant's website. In this exemplary online system, the cardholder 1 selects products from a merchant's online website 2, is routed or clicks to the merchant's payment page 2a (FIG. 5). The cardholder 1 is hyperlinked (manually or automatically) to a card provider's web site to log in 130 (FIG. 5), which resides on and is managed by the card provider's user interface system 4 (e.g., web server), and, upon logging in, obtains a STN 15 that may then be "cut and pasted," "dragged and dropped" (or alternatively, automatically filled by the card provider 3 or downloaded from a digital wallet) into the payment fields 144, 146, 148 (FIG. 7) on the payment web page 2*b* (FIG. 7). In alternative embodiments, the system includes one or more of the following: the card provider 3 sends the STN 15 directly to the merchant 2, the STN 15 is encrypted or encoded, the cardholder 1 enters additional security numbers or other indicia or a biometric sample is required from the card provider 3. In an exemplary embodiment, the STN 15, as will be discussed next, is generated by the card provider's application server 5 and STN database 6.

After authenticating a cardholder 1 during the log-in process, and receiving a request for a STN 15, the process begins for generating a STN 15. The user interface system 4 prompts the initiation of the number generation process in the STN transaction system 18. In an exemplary random number generation process, the STN 15 is generated (preferably immediately) and provided to the cardholder 1 (preferably contemporaneous with the cardholder's request). As previously noted, this allows the number to be usable immediately upon receipt by the cardholder 1 without the need for separate activation (although separate activation features are contemplated by the present invention), while minimizing any increased risk of theft or fraud.

Figure 10:
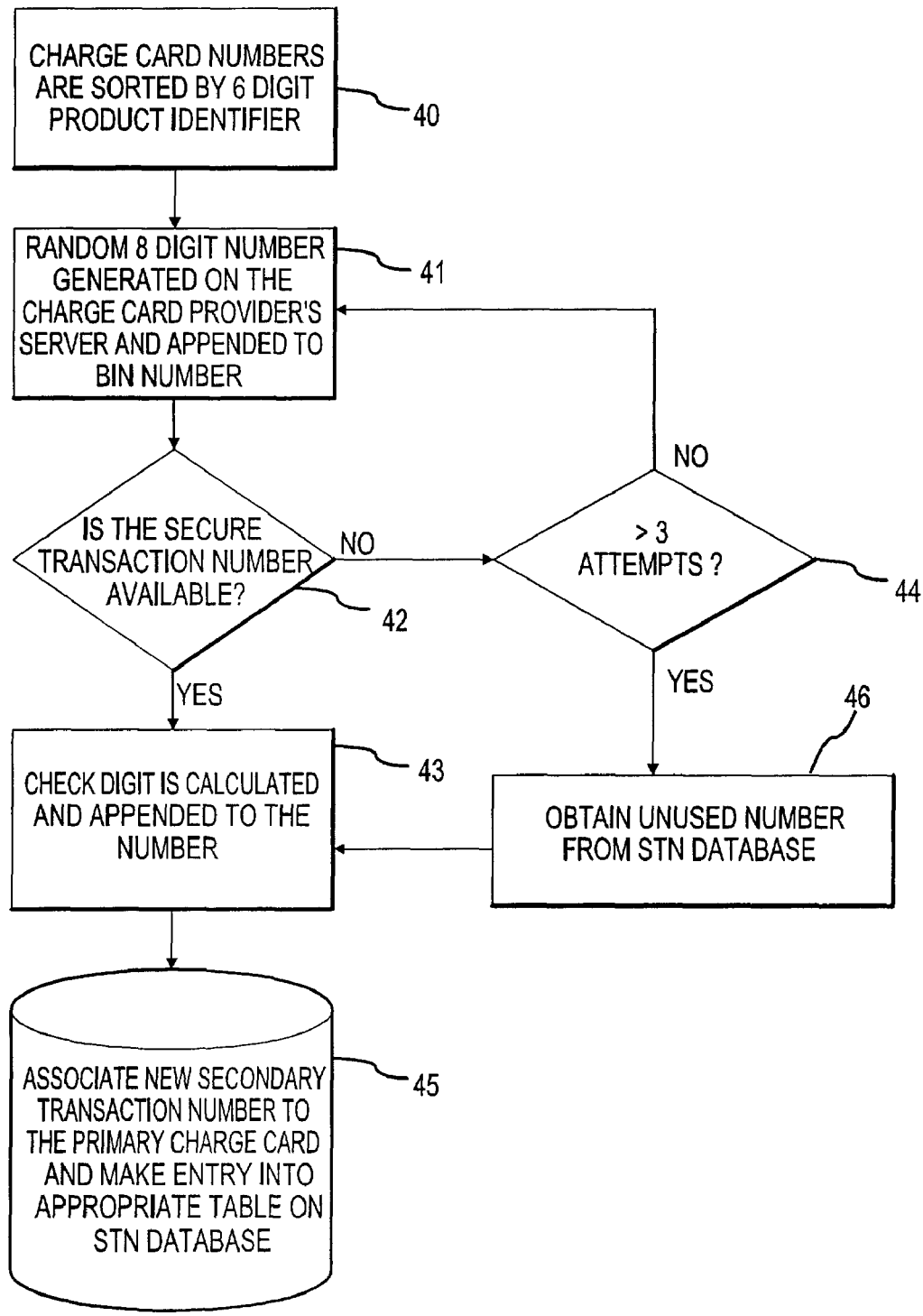
FIG. 10 is a flow chart of an exemplary secondary transaction number generation process of the present invention.

An exemplary random number generation process is depicted in FIG. 10. In this exemplary embodiment, each card provider 3 (FIG. 1) is generally identified by a range of numbers on the physical card, typically called the bank identification number (BIN). Each card possesses a product identifier (e.g., first 6 digits. BIN, etc) that is not part of the random number generation process, but in order to initiate the process, this number must first be selected (step 40). It may be preferable for a card provider 3 to set aside a set of product identification numbers relating to secondary transaction numbers for specific use with the transaction system. Alternatively, however, some card providers may find it desirable to use the same BIN number designation for both STNS 15 and regular charge card numbers so that one cannot distinguish between the two types of numbers. As depicted in FIG. 10, a random eight digit number is generated by the card provider's application server 5 using an algorithmic process (step 41). The application server 5 verifies that the randomly generated number is available (i.e., it is not in use nor has it been used within a certain period of time) (step 42). If the transaction number is free (i.e., not in use), a check digit and the selected product identification number is appended to the number (step 43). This newly created STN 15 is then associated with the cardholder's PCC 20 and is provided to the cardholder 1 (step 45), whereupon the STN database 6 is updated to reflect that this particular STN 15 is in use and associated with a PCC 20 account. If, during step 42, it is determined that the number is in use, the number generation process is repeated up to a preset number of times (e.g., 3) (step 44). After attempting and failing to generate a non-used random number for a preset number of times, a non-used random number is physically selected from the STN database 6 (step 46).

After the STN 15 is generated, conditions of use parameters are applied, and are associated with the PCC 20, the STN 15 is then distributed (i.e., issued) to a cardholder 1 for use in facilitating a transaction. Communication of the STN 15 may occur via a number of use interface systems 4. For example, FIG. 7 depicts an exemplary online interface where the STN 15 (Private Payment number) is returned to the cardholder 1. This embodiment shows how the card provider window 140 overlays a merchant's online payment page 2*b*. The cardholder 1 selects the appropriate charge card (e.g., American Express®) from the credit type filed 144. The cardholder 1 is then able to "cut and paste" or "drag and drop" the STN 15 (present in the STN field 142) into the credit card field 146 on the web-page 2*b*. Finally, the cardholder 1 chooses the appropriate expiration date 148 and completes the transaction by selecting the "purchase now" button 150. Although this embodiment describes linking to a card provider's web site to receive a STN 15, an additional embodiment configures the user interface 4 (e.g., web server) and STN transaction system 18 to seamlessly interact with the merchant's website to eliminate the need to separately link to the card provider 3. In this instance, the generation and issuance of the STN 15 would use the merchant 2 as a gateway to the card provider 3. Any number of interface systems 4 can be used to facilitate the processes described above (FIG. 2 steps 100, 105, 110).

For example, as just described, distribution of the STN 15 may occur via a "server to desktop" arrangement where a connection is established between the card provider's web-server 4 and the cardholder's 1 desktop computer, using SSL 3.0. With this exemplary system, the number is generated by the application server 5 (according to an algorithmic processing feature) utilizing a random number generation process such as that previously described and delivered to the web server 4. The number is then displayed on the cardholder's 1 desktop. While pre-registration is not required, in an exemplary embodiment, a cardholder 1 will have previously registered at the card provider's 3 online web site providing all required personal information, primary charge card account numbers, and establishing a cardholder ID and password (if not already established). The cardholder ID and password are then used for verification of cardholder 1 identity when logging into the card provider's web server 4.

Distribution of STNs 15 may also occur via a "server to IVR" arrangement, where a cardholder 1 calls the card provider 3 in order to obtain a STN 15. In this exemplary embodiment, a voice response menu enables the cardholder 1 to choose the transaction option, and allows the cardholder 1 to enter a main account number. Once identity is verified, a link to the application server 5 is established, prompting generation and delivery of a STN 15 over the phone. In this embodiment, the cardholder 1 provides authenticating information by providing date of birth (DOB), a PIN, etc. Once this verification number is matched to customer's records, the STN 15 is distributed. Of course, this process would also work with a live operator arrangement.

Additional distribution embodiments include a number of different delivery vehicles and/or portable data devices, such as use of wireless devices, smart chip encoded devices, personal digital assistants (PDAs), pagers, interactive IVs, etc. For example, a "server to wireless device" is used where a wireless phone with internet browser is able to access the card provider's transaction site via the card provider's online service web site. The STN 15 can be delivered via text or voice. Additionally, with the use of encryption keys, the wireless device can be used as payment vehicles (e.g., STN 15 is delivered from the cardholder 1 to merchant 2 or other customer with Blue Tooth or other beaming technology). Again, verification of identity can be accomplished by a variety of means, including cardholder ID and password, DOB, PIN number, SIM cards in phones, etc.

Another exemplary embodiment of the transaction system, utilizing one or more of the distribution arrangements above, includes situations where a Point of Sale terminal (POS) is not present (e.g., submitting a STN 15 to a merchant 2 such as, for example, a plumber at home). In this exemplary embodiment, the cardholder 1 may not have cash or may not want to provide her PCC 20 number to the vendor due to concerns about unauthorized re-use. As such, the cardholder 1 calls the card provider 3 seeking to obtain a STN 15 with either predefined conditions of use or cardholder determined conditions of use. A voice recognition system asks for a PCC 20 number, the amount she wants to authorize, a merchant ID (e.g., SE number), or any other conditions of use. The voice recognition system communicates with the application server 5 and, alternatively, also CAS 7, to generate the STN 15. The STN 15 is then transmitted to the cardholder 1 who in turn provides to the merchant 2. Additionally, the merchant 2 can also receive, if desired, an immediate call from the voice response unit to provide an approval code. One skilled in the art will appreciate that this system can be used in association with landline phones, cellular phones, pagers, handheld computers or any other PDA devices.

Another exemplary embodiment of the present invention utilizes a smart card system or similar portable data device to generate and/or distribute a STN 15 to the card provider 1 or merchant 2. The smart card may facilitate the generation of a STN 15 in a number of different ways. In one embodiment, the smart card device itself generates the STN 15 from a self-contained processing chip. In another embodiment, the smart card interfaces with the card provider's user interface system 4 to cause the card provider 3 to generate a number. In another embodiment, the smart card supports interaction with a merchant's transaction processing system. "Smart card" is referred to herein to include any microchip enabled transaction card that is capable of being read by a smart card reader, and is also referred herein to generally refer to any portable data device that is capable of processing information. In an online embodiment, the cardholder 1 installs a smart card reader and associated software to be used with the cardholder's computer system that is capable of connecting to the internet. When desiring to make an online purchase, the cardholder 1 swipes or inserts his smart card through a card reader and enters an appropriate PIN. Once properly authenticated, the card provider transaction system generates and issues a STN 15 to the cardholder 1. In another embodiment, the merchant 2 may have a smart card reader capable of interfacing with the cardholder's smart card. In this embodiment, the cardholder 1 swipes or inserts the smart card through the merchant's reader, a PIN is entered and the STN 15 is displayed to the merchant 2. Additional information relating to smart card and smart card reader payment technology is disclosed in Ser. No. 60/232,040, flied on Sep. 12, 2000, and U.S. Pat. Nos. 5,742,845, 5,898,838 and 5,905,908, owned by Datascape; which are hereby incorporated by reference.

With an exemplary online smart card embodiment, the cardholder 1 interfaces with the card provider's user interface system 4 (e.g., website) and registers the smart card for use with the transaction system option. The cardholder 1 downloads a program and the program is stored on the cardholder's computer. A STN transaction icon (e.g., Private Payments$^{SM}$ button) appears on the cardholder's browser or an icon appears on the display (e.g., Microsoft Windows® system tray). This button, driven by a card provider specific application (activator) that resides on the cardholder's computer, appears each time the cardholder 1 launches the browser (or alternatively the button appears at any predetermined intervals, cycles or URLs).

The cardholder 1 suitably links to an online shopping site, orders a product or service or fills a shopping cart and goes to the payment page. The cardholder 1 clicks the STN payments button on the browser or the icon on the display (or the activator automatically launches the STN button) and a pop-up window appears, asking the cardholder 1 to enter the smart card into the smart card reader and, in a preferred embodiment, enter his PIN number. In an alternative embodiment, a PIN may not be necessary. In another embodiment, any other security data or functionality may be included. Upon entering this information, the STN 15 will be generated by the card provider's STN transaction system 18 (FIG. 8), or, in another embodiment (discussed below) will be generated directly from the smart card chip; and a pop-up screen containing the STN 15 number will be displayed on the computer. The cardholder 1 then "drags and drops" or "cuts and pastes" the randomly generated STN 15 and other transaction information (e.g., card type, expiration date) into the online order form and completes the transaction. In an alternative embodiment, the STN 15 and other transaction information are automatically filled into the web shopping page by the card provider's web server.

Another exemplary embodiment of the present invention integrates a smart card with an online merchant's website, which may or may not be utilized by the cardholder 1. For example, in one aspect of this embodiment the smart card cardholder goes to a merchant website and a "smartchip" payments checkout button appears on the credit card payments page. The card provider's transaction system will be invoked if the card holder 1 checks out via the smartchip payments button. In a preferred embodiment, the transaction system option is "behind the scenes." The cardholder 1 goes to an online shopping site, orders a product or service or fills a shopping cart and goes to checkout page. The cardholder 1 clicks the smartchip payments button on the browser and a pop-up window appears, asking the cardholder 1 to enter the smart card into the smart card reader and, optionally, enter his PIN number. Upon entering this information, the system logs the cardholder 1 into smartchip payments checkout process. The cardholder 1 will hit "check out" and the smartchip payments checkout process may auto-generate and auto-fill the STN 15 and transaction information into the appropriate payment field (an applet may be read off of the smartcard to transfer number to merchant site.) In this embodiment, the STN 15 will be auto-generated off the chip, where the smart card chip may use the Java or Multos operating systems and may use a random number generating algorithm. In one embodiment, the smart card chip is able to access the card provider's transaction system or, alternatively, contain a pool of possible numbers (in order to avoid generating the same number twice). The number is also need sent back to the STN transaction system 18 in order to match the PPC 20 number with the STN 15.

In another embodiment using a smart card, a secure electronic transaction (SET) protocol is used to avoid or minimize system/server contact. In this embodiment, the PCC 20 number is on the chip but is encoded. The SET protocol is preferably an encryption algorithm on the chip where part of the initial data would be the cardholder's PCC 20 number. The algorithm could be decoded by the card provider 3 but not by the merchant 2 to come up with the real account number. In one embodiment, the merchant 2 routes the authorization to the card provider via a BIN number rather than the PCC 20 number. When the transaction is sent from the merchant 2 to the card provider 3 for authorization, the CAS 7 preferably triggers the decode algorithm to complete the process, linking the STN 15 to the PCC 20 account.

Another embodiment contemplates the use of the STN 15 with a transponder system comprising a first means for generating or storing a signal that includes an encoded STN 15 and a second means for reading or receiving the signal. In an exemplary embodiment, a cardholder 1 waves a small transponder unit in front of the merchant's 2 receiving unit. The STN 15 information can be sent/received by a number of known methods (e.g. optical, magnetic, infrared, radio frequency, etc). The merchant 2 reader captures the STN 15 and forwards the STN 15 (with the associated transaction information) to the card provider's CAS 7 as previously described. The transponder units may be set up in a number of ways. Each transponder device may hold one STN 15 with certain predefined parameters or each transponder device may have several STNs 15.

Referencing FIGS. 1 and 11, after the secondary transaction number (STN 15) is provided to the merchant 2, the merchant 2 submits an authorization request to the card provider 3, as it would with any other credit card transaction. This request is routed to a card authorization system (CAS) 7 for authorization (step 80). The CAS 7 recognizes the transaction as involving a STN 15 and forwards the transaction information to the Authorization Request Listener 77 program on the application server 5 (step 81). The Authorization Request Listener 77 passes the transaction information to a CAS Authentication Component 78 (step 82). The CAS Authentication Component 78 determines if use of the STN 15 has satisfied the previously defined conditions of use parameters. To determine this, the CAS Authentication component 78 looks to the STN database 6 for the conditions-of-use rules and the primary charge card number (PCC 20) that are associated with the particular STN 15 (step 83). If the use of the STN 15 complies with the rules of use, the CAS Authentication component 78 returns an authorization message and the associated PCC 20 to CAS 7 (step 84). CAS 7 then performs an authorization request for the PCC 20, as is typically done with any physical charge card, to ensure that the primary charge card conditions (e.g., credit limit, expiration date, etc.) have been met.

If CAS 7 authorizes use of the PCC 20, the transaction involving the STN 15 is approved and an approval code will be generated. However, the PCC 20 must first be replaced with the STN 15 and the STN database 6 must be updated to reflect this transaction data. This is accomplished by CAS 7 returning to the CAS Authentication component 78 an approval message with the transaction data (step 85) and CAS Authentication component 78 forwarding to a reversal processing engine 79 (step 86). The reversal processing engine 79 interfaces with the STN database 6 to re-substitute the STN 15 for the PCC 20 and also to update the STN database 6 to reflect the transaction information (step 87). For example, if the conditions of use parameters associated with the STN 15 authorized two transactions, this step 87 updates the cardholder account in the STN database 6 to reflect that only one transaction remains. The reversal engine 79 substitutes the PCC 20 with the STN 15 and forwards to CAS 7 (step 88). CAS 7 then provides the results to the merchant 2 (step 89). If the CAS Authentication Component 78 does not authorize use under the STN 15 conditions or if CAS 7 does not authorize use under the PCC 20 conditions, the transaction will not be approved. When the use conditions of both the primary charge card and the secondary transaction numbers are satisfied, the transaction is approved. In this preferred embodiment, however, the STN 15 is not deactivated to prevent settlement. To the contrary, settlement may proceed (as discussed next) even when an authorization was declined.

Additionally, use of other third party networks and systems are contemplated by the present system. One exemplary system allows a card provider 3 to associate STNs to third party accounts, offering the same fraud reduction benefits to external card issuers. Here, in this exemplary system for authorizing STN, a merchant 2 submits an authorization request to a card provider 3. CAS 7, recognizing the STN 15 forwards the request to application server 5. The conditions of use are checked and the authorization request is modified to substitute the STN 15 with the associated primary account (PCC 20). In some cases a merchant identifier may be included in the authorization request. Therefore a translation may occur to substitute the card provider 3 merchant ID with the corresponding third party card issuer merchant ID. The request is then returned back to CAS 7 for a normal authorization. CAS 7 then recognizes the account as originating from another issuer (third party issuer 92), forwards the authorization request to a third party issuer's network for processing (step 84a). The network 91 routes the request to the appropriate third party issuer 92 for an authorization determination. The third party issuer 92 processes the authorization request and returns the result to CAS 7 for forwarding back to application server 5 (step 84b). Application server 5 saves the authorization result (approval or denial) and substitutes the PCC 20 with the STN 15 and returns to CAS 7 for forwarding to the merchant 2.

The authorization and settlement processes may occur as separate steps or as a single step. In one embodiment, referred to herein as an electronic data capture (EDC) system, the merchant 2 sends an authorization request and if the authorization request is approved, a receipt of charges is created and submitted for the merchant 2. Separate sequences of file transmissions or messages are therefore not required. Various embodiments, hybrids, and modifications of these processes should be apparent to one skilled in this art.

Prior art systems typically deactivate a temporary transaction number during the authorization process if limited-use conditions are not met. As previously explained, because of the uncertainty and variability of the authorization processing, this often results in a transaction numbers being unintentionally deactivated, thereby bringing the transaction processing to a sudden halt. An exemplary embodiment of the present invention overcomes this problem by not "deactivating" the secondary transaction number when predetermined conditions are not met. But instead, allowing the transaction to proceed through settlement, albeit without a valid approval code, where the merchant bears the risk that the amount will later be charged back by the card provider 3 if the transaction is disputed by the cardholder 1.

An exemplary settlement process of this invention involves the backend systems shown in FIG. 8. Specifically, referencing FIGS. 1 and 8, the backend process utilizes a financial capture system (FINCAP) 10 to capture the settlement information (e.g., receipt of charges "ROC" and summary of charges "SOC") from the merchant 2, a backend application service 8 to ensure that proper account information is processed, an accounts payable system 9 to pay the merchant 2, and an accounts receivable system 11 to process the account statement that is provided to the cardholder 1. An exemplary embodiment of the settlement process involves a settlement request being made by a merchant 2 for a transaction involving a STN 15. All settlement requests are forwarded to the card provider's back end system 14 for processing where the request is initially sent to FINCAP 10. FINCAP 10 captures the ROC and SOC data and identifies, via the card product identifier (or by any other suitable means), the transaction as involving a STN 15. In another embodiment, the product identifier (or BIN number) does not differentiate between a STN 15 and a regular charge card number. In that instance, it will be necessary for FINCAP 10 to call the backend application service 8 (which interfaces with the STN database 6) to identify the STN 15 from other charge numbers. After the STN 15 is distinguished from the ordinary physical charge cards, FINCAP 10 verifies that the number is valid (i.e., exists in the STN database 6). If the STN 15 is a valid number, FINCAP 10 creates a payment (accounts payable) file including the transaction data and sends a payment message to the AP system 9 instructing the merchant 2 to be paid. In paying the merchant 2, the card provider 3 references only the STN 15 and does not release the PCC 20 or any other regular charge card numbers.

The back-end system 14 processes the cardholder 1 STN account information as follows. After capturing the transaction information (ROC and SOC) from the merchant 2, FINCAP 10 creates a cardholder account (accounts receivable) file and sends a message to the back-end application service 8 to process the information for cardholder billing. Recognizing that the transaction involves a STN 15, the back-end application service 8 replaces the STN 15 with the PCC 20, updates the cardholder STN account information in the STN database 6 to reflect the appropriate transaction settlement information, and processes the transaction as with any other transaction. The backend application service 8 sends the transaction details to the AR system 11, where the AR system 11 sends the proper statement to the cardholder 1, typically referencing only the PCC 20 number. In another embodiment, the AR system 11 may process the statement where the transactions are further categorized and itemized by both the PCC 20 number and the STN 15.

As previously noted, it may often be the case with prior art systems, that the temporary transaction number is inadvertently deactivated during the authorization phase and completion of the transaction is not possible. e.g., multiple payment purchases. The present transaction system overcomes this problem by ensuring that valid transaction numbers will be processed. If the conditions-of-use parameters are not met, the cardholder 1 is, under an exemplary embodiment of the present system, able to dispute the transaction and have the transaction charged back to the merchant 2 during the dispute handling process (discussed next). During this dispute handling phase, the card provider 3 will retrieve information from the STN database 6 to determine if the disputed information was "authorized", i.e., has an associated approval code. If the transaction was not "authorized" because the conditions of use parameters were not satisfied, the amount will be charged back to the merchant 2 according to predefined business rules.

Another embodiment provides for checking the approval codes and other conditions during settlement. Here, transaction information (approval code, SE number, or other information) may be checked during settlement. For example, the backend application service 8 (or the application server 5) may compare transaction information to a business rule or conditions set associated with a cardholder 1 STN account. If conditions of use have not been met or if a valid approval code is missing, the service 8 or server 5 may cause a charge back to be issued to the merchant to offset the previous merchant payment. In other words, in this alternative embodiment, where an STN 15 transaction is processed through settlement, the following events may occur in sequence. First, a payment file is established once it is determined that the STN 15 is a valid number. Second, the merchant is paid. Third, the system applies the business rules or conditions for the particular account associated with the STN 15. Fourth, if it is determined that the merchant 2 should not have been paid in the first instance because the transaction conditions were not met or an approval code was not present, the system will execute a charge back to the merchant 2. This settlement processing may be transparent to the cardholder 1 since, before the AR system releases a cardholder billing statement, the merchant is paid and then charged-back resulting in no outstanding balance to the cardholder 1.

As shown in FIG. 8, the present invention contemplates the interaction of clearing and settlement systems other than those of the card provider 3. This exemplary system allows a card provider 3 to clear and settle STN transactions where an STN 15 is associated to a third party account, meaning that the merchant 2 is paid and the charge is billed to the cardholder 1. As such, an exemplary embodiment of the present invention is configured to support interaction with third party networks and systems. Here, the backend application service 8, upon receiving a STN 15, recognizes that the associated PCC 20 originated with another card issuer 92. The backend service 8 separates the transaction into two transactions (a clearing transaction and a settlement transaction). A substitution occurs in the clearing transaction where the STN 15 is replaced by the associated PCC 20. Also, a translation may occur to substitute the card provider 3 merchant ID with the corresponding third party card issuer ID. The transactions are then forwarded to a third party clearing and settlement network 93. The third party clearing and settlement network 93 handles the routing, as appropriate, to a merchant acquirer's accounts payable system 91 and an issuer's accounts receivable system 92. As noted above, the accounts payable system ensures that all correspondence with the merchant 2 references the STN 15.

The dispute handling process of the present invention involves situations where a cardholder 1 or merchant 2 disputes charge that is associated with a transaction involving a STN 15. Generally, a cardholder 1 disputes a charge by contacting the charge card provider 3 via phone, mail, or internet. As previously noted, an exemplary AR system 11 typically bills the cardholder 1 with reference to only the PCC 20 number. The computer systems of the present invention allow the card provider's customer service representatives to lookup information based on, inter alia, the STN 15 or the PCC 20 number. FIG. 12 depicts an exemplary look-up screen 175 for reviewing the primary charge card account 20 and the transactions associated with the STNs 15.

With respect to a cardholder initiated dispute, the representative initiates a dispute through a dispute handling system (DHS) to obtain the case avoidance or case set rules for cardholder disputed transactions. One of the case avoidance or case set rules provides for a look up from the STN database 6 to verify that the transaction was processed with an approval code. The rule set may provide for, inter alia, an automatic charge back of the transaction amount to the merchant if an STN 15 transaction is submitted without an approval code. The DHS or the representative initiates a cardholder 1 or merchant 2 contact (via phone, mail, internet). Disputes involving STNs 15 may be automatically routed to predefined STN queues based on industry type (i.e., airline, car rental, etc). Contact letters may be automatically filled with information retrieved from the STN database 6. The adjustment file accesses the application server 5 (or backend application service 8) to substitute the PCC 20 number with the STN 15. A letter file is then generated and an electronic transmission system routes electronic contacts to and from various merchant interfaces.

In an exemplary system for handling disputes from merchant 2, a merchant 2 contacts the card provider 3 via normal channels. The card provider's representative generally accesses a customer service application that is used to service merchants. This customer service application identifies the account by a STN 15 in dispute. A case is set-up with the STN 15 and is managed via adjustment management systems. The adjustment management system and a letter generating system access the STN transaction system 18 for the account number swap, where the PCC 20 number is replaced with the STN 15 for financial adjustments intended for the cardholder 1. The remaining inquiry is processed as with existing dispute handling systems.

Although the previously described embodiments generally relate to a cardholder's 1 request for a STN 15, the merchant 2 may also find it desirable to request secondary transaction numbers from the card provider 3 in order to limit exposure to credit card fraud. In traditional transaction processes, upon completing a transaction, the merchant 2 stores transaction information (including the customer's credit card number) in a merchant database. This database of information is subject to credit card fraud in that a thief could hack into the merchant's computers to steal its customer's credit card numbers. To limit exposure, the merchant 2 may desire to replace those customer credit card numbers with STNs 15 that are associated with the cardholder's primary credit card number (e.g., PCC 20), i.e., the merchant may not want its database filled with actual customer credit card numbers. In this situation, only the card provider 3 maintains the actual credit card number and the merchant 2 retains only the STN 15. In an exemplary process, the merchant receives a regular credit card number from a cardholder 1 to facilitate a transaction. The merchant 2 submits the number to a card provider 3 for authorization, requesting that the card provider 3 instead of returning the regular credit card number, return a STN 15 (and approval code) that is associated with the regular credit card. In response, the card provider generates a STN 15, associates the number to the regular credit card number (which becomes the primary account (e.g., PCC 20)), checks to see if authorization is appropriate and returns the authorization record (only referencing the STN 15) to the merchant 2. The merchant 2 processes the transaction through the normal settlement channels, referencing the STN 15 instead of the regular credit card number. When retaining transaction records, the merchant 2 replaces the primary credit card number with the STN 15 and maintains the STN 15 in its database.

In another embodiment, the merchant 2 accepts only STNs 15—not regular credit card numbers—from cardholders to complete transactions. For the same reasons stated above, the merchant 2 may desire to limit receipt of regular charge card numbers to limit exposure to credit card fraud. In one exemplary embodiment, the merchant 2 computer system differentiates between STNs and regular charge card numbers and will not allow customers to use regular charge card numbers to facilitate a transaction (i.e., will refuse the transaction). As previously described, however, the STN 15 and the regular charge card may be transparent to the merchant 2 making it difficult for the merchant 2 to differentiate between the STN 15 and the regular charge card. In this situation, in an exemplary embodiment, the STN 15 will be identified during the authorization process by the card provider 3, where if the STN 15 does not meet certain conditions defined by the merchant 2, the transaction will not be authorized. For example, the merchant could require that all customer transactions be completed with a STN 15 that has limited-use conditions restricting use to the amount of the transaction or restricting use to the particular merchant. During the authorization process, the STN 15 is compared with the merchant-defined conditions where if the conditions are not satisfied, the authorization request will be denied. After completion of the transaction, and upon satisfying the merchant 2 conditions, the STNs 15 have little to no value and would be of minimal value to a potential thief.

Several additional embodiments of the transaction system are provided below.

In one embodiment, the STN database 6 is used to facilitate the merging of a newly acquired cardholder base with an established cardholder base. For example, when a bank or other institution sells a cardholder base to a card provider 3, the card provider 3 creates new physical accounts for the acquired cardholders and does not issue new cards. The STN database 6 is updated to associate the acquired cardholder account numbers to the newly created accounts. This allows the cardholders' existing physical cards to still be used and processed appropriately. The card provider (BIN) routing is modified for the acquired accounts so authorization requests and settlements are sent to the card provider 3 instead of to the bank or other institution. CAS 7 and FINCAP 10 recognize these acquired accounts as STN 15 accounts and translate the numbers appropriately. The end result is that charges made by the acquired cardholders end up on a statement generated by the card provider 3.

In another exemplary embodiment of the transaction system, a card provider 3 may provide a line of credit to a customer or to a merchant 2 or group of merchants who can private label for use by their customers. This allows the merchant 2 to provide a branded line of credit with minimal or no changes to the credit card authorization and settlement process. In one embodiment, the merchant 2 approves a line of credit or asks the card provider 3 to approve a line of credit for the customer. The card provider would then issue a STN 15 to the customer via the merchant 2. This STN 15 is generally used with the merchants 2 who are issuing the line of credit. When the customer wants to make a purchase using the merchant's line of credit, the merchant forwards a standard credit request to the card provider 3 with the STN 15 used as the credit card number in the transaction protocol. The card provider 3 verifies that the line of credit is authorized and was submitted by the merchant 2 issuing the line of credit associated with this STN 15. The card provider transaction system (via the STN transaction system 18) is capable of denying usage of this line of credit at another non-participating site. The card provider 3 may provide a private label or co-branded web, site to apply for the line of credit. The card provider's back end system 14 then bills the customer and pays the merchant. The merchant 2 may keep the electronic line of credit privately at their site, or provide it to the customer. The authorization system would not authorize usage at other sites.

Figure 13:
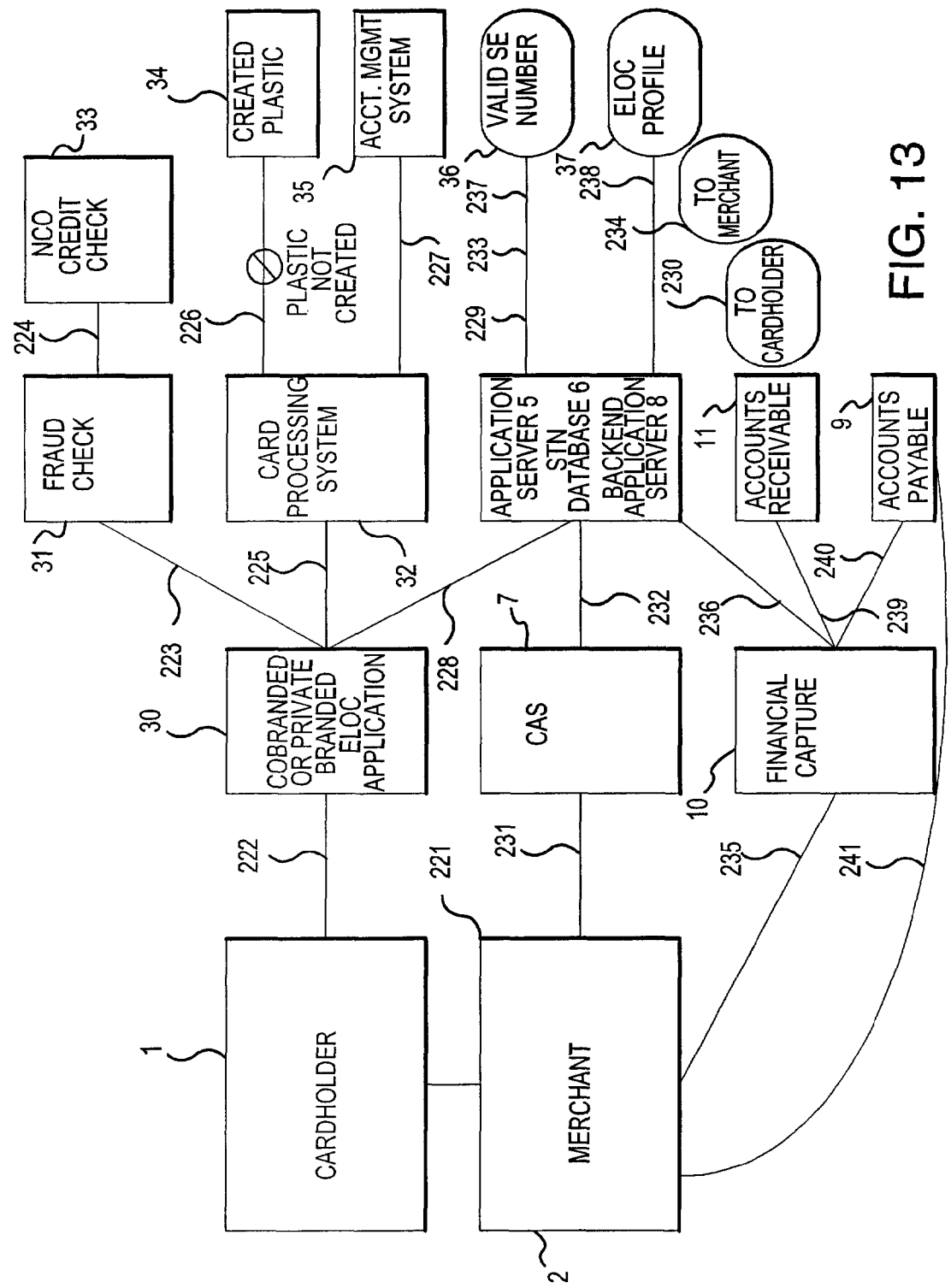
FIG. 13 is a flow diagram depicting an exemplary embodiment of the present invention involving an electronic line of credit system.

FIG. 13 depicts an exemplary transaction process for use in providing lines of credit to merchants 2. A cardholder 1 or customer (who may or may not be an existing card member of the participating card provider 3) applies for an electronic line of credit (ELOC) with a merchant 2 (step 221), the merchant 2 redirects the cardholder 1 to the card provider's 3 website to fill out the ELOC application 30 (step 222). A fraud check 31 is performed (step 223) and a credit inquiry is typically performed by any credit bureau company 33 (step 224). If a card processing system 32 determines that credit is acceptable, an account is set up (step 225). A physical card 34 is not generated as with typical processes and may need to be purged depending on the particular system set-up (step 226). The account is sent to the account management system 35 (step 227) and then forwarded to the STN database 6 and the application server 5 (step 228). The cardholder 1 account is then related to a valid merchant identification number such as the SE number 36 (step 229). An account is then set-up with a ELOC profile 37 and at this point the secondary transaction ELOC number is passed back to the cardholder 1 (step 230). The merchant 2 submits the ELOC payment request to CAS 7 (step 231), and CAS 7 routes the ELOC to the STN system (step 232), where the STN system verifies that the SE number is approved for this particular ELOC (step 233). The STN system translates the ELOC STN to the related account in the account management system and returns the ELOC STN to merchant (step 234). The merchant is then required to submit the authorization code with the receipt of charges (ROC) and summary of charges (SOC). The merchant submits the ROC and/or SOC to the card provider's FINCAP 10 (step 235), whereupon FINCAP forwards the ELOC to the STN system (step 236). The STN system verifies that (i) this SE number is valid for the particular ELOC account (step 237) and (ii) the particular transaction was authorized for the specific ELOC account (step 238). The STN system then flips the card number, returns it to FINCAP 10, whereupon, the number is forwarded to the card provider's accounts receivable system 11 (step 239). FINCAP forwards the ELOC STN and associated information to the Accounts Payable system 9 (step 240) and pays the merchant 2 (step 241).

Another exemplary embodiment allows a cardholder to fund an online digital wallet with the secondary transaction number. In this embodiment, after generation and association with the primary charge card, the secondary transaction number is provided to the cardholder to use within a designated digital wallet, which may reside locally at the cardholder's computer or may be stored in an online password protected account.

In yet another alternative embodiment, the secondary transaction system may be used to facilitate programs involving non-currency tender, such as the American Express® Membership Rewards as Curreny™ system that is detailed in U.S. Provisional Application No. 60/200,492, filed on Apr. 28, 2000, and U.S. Provisional Application No. 60/201,114, filed on May 2, 2000, which are hereby incorporated by reference. One embodiment of this system, depicted in FIG. 14, allows a cardholder 1 to create a STN 15 to be used to spend membership rewards points. In general, a membership or incentive rewards program is a loyalty program that rewards cardholders for using their charge card to make purchases. Cardholders accumulate points by using a participating charge card or by purchasing products at a participating merchant. These points may then be converted to a monetary value and redeemed to purchase merchandise.

Figure 14:
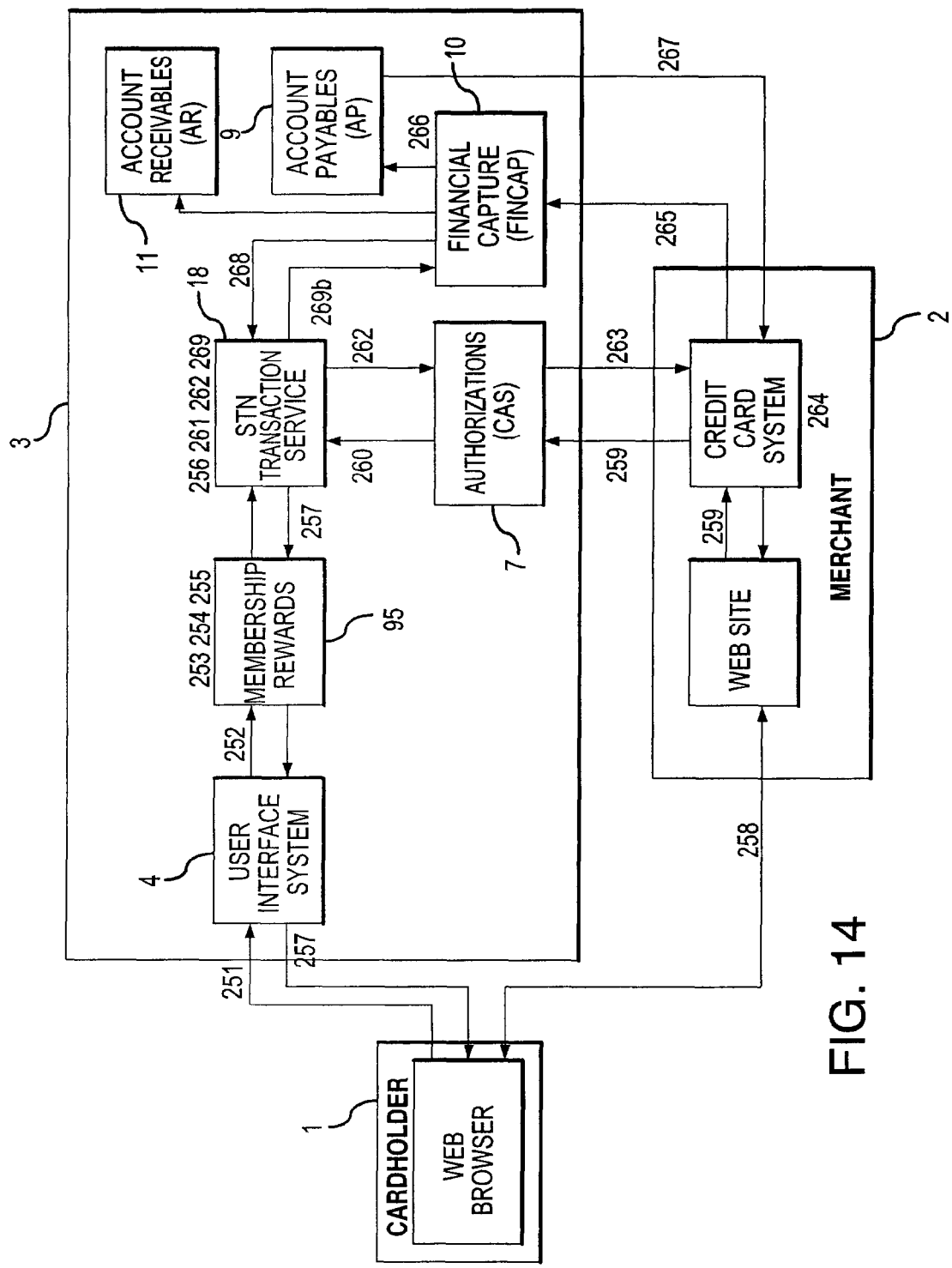
FIG. 14 is a flow diagram depicting one embodiment of an exemplary transaction system of the present invention used to facilitate a non-currency based membership rewards program.

As depicted in FIG. 14, a cardholder 1 accesses and logs onto the card provider's services via a user interface system 4 (e.g., an internet connection) (step 251). The cardholder 1 proceeds (clicks on hyperlink) to the membership rewards (MR) system 95, where she indicates that she would like to use her membership reward points that are available in her MR account (step 252). The MR system 95 reports to the cardholder 1 how much the available MR points are worth (step 253). The cardholder 1 indicates how many of the MR points (converted to monetary value) should be loaded info an account that can be used for purchases (step 254). In an exemplary embodiment, the STN 15 can be associated with a MR account, i.e., a primary charge card account that is funded with these MR points. Use of this MR account may be limited by the card holder 1 or the card provider 3, or could be further limited by the MR system rules of use that may have been predefined by participating merchants (step 255). Once the MR system 95 has approved the request and allocated the requested MR points, the STN system 18 associates a STN 15 and establishes an MR-STN 15 profile (256). The MR-STN profile contains the options that will be applied and the amount that will be available to the resulting STN 15. The STN system 18 returns the STN 15 (and other account information) to the MR system 95 to provide to the cardholder 1 for use in completing subsequent transactions (e.g., online purchases) (step 257).

When desiring to purchase products using the MR point-funded STN 15, the cardholder 1 proceeds to a merchant site (e.g., online website), selects goods and is requested by the merchant to provide payment information (e.g., via an online payment web page). The cardholder 1 chooses the appropriate card provider 3 as the form of payment (e.g., American Express®, Visa®, etc.) and enters the STN 15 (and other needed information) into the appropriate payment fields (step 258). The merchant processes the STN 15 authorization as discussed above (step 259), where the card provider CAS 7 recognizes the transaction as involving a STN 15, and forwards the request to the STN system 18 containing, inter alia, an application server (FIG. 8, number 5) and a STN database (FIG. 8, number 6). It should be appreciated that profile information may be stored in a MR database, STN database 6 or any other suitable database (step 260). The STN system 18 recognizes the account as a MR account, and verifies that optional conditions, if any, are met. If the conditions are not met, an error is returned to CAS 7 and then to the merchant (step 261). If the conditions are met, the balance available on the MR-STN profile is reduced by the purchase amount, a record of the purchase is recorded in the MR-STN profile, and an approval code is returned to the authorization system (step 262) and then to the merchant (step 263). Although additional CAS 7 processing is contemplated by this embodiment, application of additional rules and validations which would typically be applied are not required for this type of account. The approved purchase is finalized by the merchant with the STN 15 transaction being submitted through the merchant's existing POS network for settlement (step 264). The STN 15 transaction is received by the card provider's financial capture system (FINCAP) 10 (step 265). The FINCAP 10 forwards the STN transaction to the appropriate AP system 9 (step 266). The AP system 9 then pays the merchant according to the appropriate settlement terms and conditions (step 267). The FINCAP 10, having identified the transaction as involving an STN 15, sends the transaction information to the STN system 18 (via a backend application service 8) to identify the actual account number (i.e., PCC 20) (step 268). The STN system 18 recognizes that the STN 15 is associated with a MR account, searches for the MR-STN profile and passes a credit request to the appropriate cardholder 1 MR account to reduce the available MR points (step 269), and (ii) the transaction record is used to build a credit against the actual charge card account (e.g., PCC 20) that will offset the charged STN 15 transaction (step 269*b*). In the first instance (step 269), the STN system 18 passes a request to the MR system 95 to deduct the appropriate number of MR points. In the second instance (step 269*b*), both the original transaction and the credit are passed back to FINCAP 10 with the actual charge card account number (e.g., PCC 20 number). The FINCAP 10 then forwards the charge and credit transactions to the appropriate AR system 11 for normal billing processing.

As shown, the embodiment depicted in FIG. 14 allows the cardholder 1 to spend the MR points in at least two ways. First, the membership reward points can be deducted at the time of the transaction processing, or second, the transaction can be reflected on the cardholder's bill along with an associated credit that reflects the payment with reward points. It should also be appreciated that a cardholder 1 may choose to use MR points on a transaction by transaction basis, and preferably, is able to combine variations of currency (e.g., credit, debit cards etc.) and non-currency tender (MR points), as desired, to effectuate a transaction. Additionally, both currency and non-currency tender may be integrated into a STN gift, where a first party gifts to a second party a secondary transaction number that has some currency or non-currency value.

Figure 15:
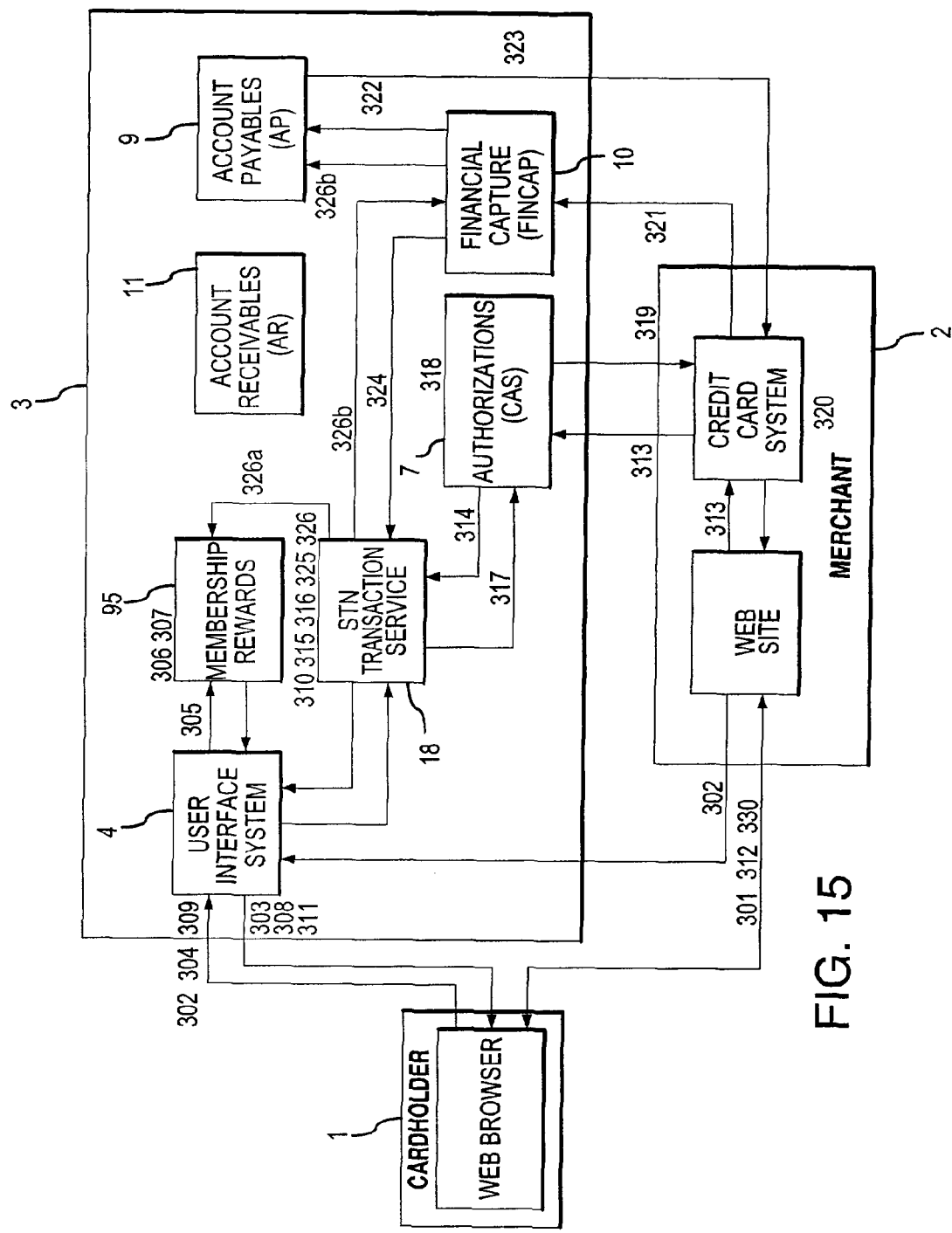
FIG. 15 is a flow diagram depicting a second embodiment of an exemplary transaction system of the present invention used to facilitate a membership rewards program.

Another membership rewards embodiment is shown in FIG. 15. Here, the cardholder 1 is able to choose to use membership reward points when shopping at a merchant 2 site that supports the membership rewards as a payment option. Referencing FIG. 15, the cardholder 1 goes to a participating merchant's site (e.g., online website) to shop for goods or services. The cardholder 1 selects merchandise and continues to a payment site, where the card provider's MR points is one of the payment options (step 301). When the cardholder selects this option, a secure connection is established with the card provider 3 that authenticates both the cardholder 1 and the merchant 2 (step 302). The card provider 3 requests the cardholder's user ID and Password, either through a pop up screen, a http redirect link, or an applet downloaded by the merchant (step 303). The cardholder 1 supplies the User ID and Password which is returned to the card provider with the purchase amount (step 304). The card provider user interface 4 (e.g., online services) causes the cardholder 1 to be authenticated, collects the associated registered card accounts and invokes the MR system 95 (step 305). The MR system 95 uses these card accounts to identify the cardholder's MR account (step 306). If none of the registered accounts are related to a MR account, the cardholder 1 is not able to use MR points to pay for her purchase and an error is returned to the cardholder 1. After identifying the MR account, the MR points available are converted to the corresponding cash equivalent and compared to the purchase amount being requested. If the purchase amount is greater than the MR cash equivalent, an error is returned to the cardholder 1 (step 307). If the MR cash equivalent is greater than the purchase amount, all card accounts participating in the MR account are collected and returned to the cardholder 1 (step 308). The cardholder 1 designates the card account to be used to house all succeeding financial activity, which is then returned to the card provider 3 (step 309). The card provider 3 then triggers the STN system 18 to establish a STN 15 that is associated to the selected MR account number and a MR-STN account profile is set-up (step 310). The STN system 18 returns the STN 15 to the User Interface System 4 and then onto the cardholder 1 (step 311), The cardholder 1 cuts and pastes, drags and drops, or auto-fills the STN 15 (and needed information) into the appropriate merchant payment field (step 312).

As previously noted, the merchant uses the existing authorization network to request authorization for the STN transaction (step 313). The CAS 7 recognizes the transaction as one involving a STN 15 and forwards to the STN system 18 (step 314). The STN system 18 identifies the associated actual account number (e.g., PCC 20 number) for the STN 15 (step 315) and also recognizes the account as a MR account. At this point, although all MR transactions would have been previously verified, the MR account balance is again checked to minimize possible fraud (e.g., fraud involving two requests using the same MR points). The cash equivalent for the MR points for the actual account are then retrieved from the MR system 95 and if the purchase amount is greater than the available amount, a denial is returned to the authorization system and to the merchant 2 (step 316). If the cash equivalent value of the MR points exceeds the purchase amount, the STN system records the purchase in the MR-STN profile and returns the STN 15 to the CAS 7 (step 317). The CAS 7 then completes the authorization for the actual account (e.g., ensuring that the limits for the PCC 20 are complied with) (step 318), and returns the results (e.g., approval code) to the merchant 2 (step 319).

The approved transaction is finalized by the merchant 2 with the STN transaction being submitted through the existing point of sale network for settlement (step 320). As before, the transaction information is received by the card provider FINCAP 10 (step 321) and then forwarded to the appropriate AP system 9 (step 322) for payment (step 323). Since the transaction involves a STN 15, FINCAP 10 directs the transaction to the STN system 18 to identify the PCC 20 (step 324). The STN system 18 identifies the PCC 20 (step 325) and also recognizes the STN 15 account is set up using MR points, where the STN system 18 searches the MR-STN profile for the associated purchase record (step 326). The STN system either (i) passes a credit request to MR to reduce the MR points (step 326*a*), or (ii) creates a credit against the billing transaction (step 326*b*). In step 326*a*, the STN system 18 passes a request to the MR system 95 to deduct the appropriate number of MR points. Here it is not necessary to return the AR transaction information to FINCAP for forwarding to the AR system 11, but a reconciliation entry is created to reconcile the AR for FINCAP 10. In step 326*b*, a transaction record is used to build a credit against a real account number (e.g., PCC 20) that will offset the charge transaction. The STN system 18 forwards this credit to the FINCAP 10. The original billing transaction is returned to the FINCAP to appear on the cardholder's 1 statement. The FINCAP 10 then forwards the charge transaction to the appropriate AR system for normal processing. The FINCAP 10 forwards the credit issued by the MR system 95 to the appropriate AR system 11 for normal billing processing. Accordingly, the cardholder 1 will see on her statement a credit reflecting the currency value of the MR points used and a charge in the amount of the transaction.

Another embodiment provides for the generation of one or more STNs that are subordinate to and associated with a main secondary transaction number that, as described above, is associated with the cardholder's PCC 20 account. As noted above, these subordinate numbers may also be digitally stored in devices such as wireless telephones, PDAs, handheld computers, and the like. Providing multiple layers of secondary transaction number provides the cardholder 1 with greater flexibility. For example, a cardholder on vacation could structure the main STN 15 to be valid for the duration of the vacation. The cardholder 1 is then able to generate subordinate secondary transaction numbers (or tertiary numbers) with varying preferences to take into account various activities that may occur during the vacation. A cardholder 1 could structure the main secondary transaction number to have a maximum credit limit of $3,000 (this assumes that the associated primary charge card credit limit is equal to or greater than $3,000) that is good for the duration of the vacation. A subordinate secondary transaction number may then be provided to the spouse with a $1,000 limit and additional secondary transaction numbers, restricted to $500 limits, could be provided to the children. Each subordinate card would be valid only for the duration of the vacation and would only be valid for the maximum dollar amount specified.

The invention claimed is:

1. A method for processing a transaction, the method comprising:

receiving, by a merchant and via a processor, an account number of a user;

submitting, by the merchant and via the processor, the account number to a provider of the account number and requesting authorization of the transaction;

requesting, by the merchant and via the processor, that the provider return a secondary transaction number (STN) in lieu of returning the account number;

receiving, from the provider and via the processor, an authorization record referencing the STN;

issuing, via the processor, a settlement request associated with the transaction, wherein the settlement request includes the STN and does not include the account number;

maintaining, by the merchant and via the processor, a record of the transaction; and replacing the account number with the STN, wherein the record of the transaction includes the STN and the record of the transaction does not include the account number.

2. A method for processing a transaction, the method comprising:

receiving, from a merchant and via a processor, a transaction authorization request for the transaction, the authorization request comprising a primary account number associated with a primary account;

generating, via the processor, a secondary account number (STN) and associating the STN with the primary account, wherein the primary account number and STN are different;

receiving, from the merchant and via the processor, a request that a provider of the primary account return the STN in lieu of returning the primary account number;

sending, via the processor, to the merchant an authorization record referencing the STN, wherein the authorization record does not include the primary account number;

processing, via the processor, a settlement request associated with the transaction, wherein the settlement request includes the STN and does not include the primary account number;

receiving, from a first party and via the processor, a transaction dispute identifying the primary account number and relating to the transaction involving the STN;

retrieving, via the processor, transaction information from a database using the primary account number; and initiating, via the processor, an inquiry, with a second party, that includes the STN, wherein the inquiry does not include the primary account number, and wherein the second party does not maintain a record of the primary account number.

3. The method of claim 2, further comprising the steps of:

determining if a valid approval code is associated with the STN; and charging back to the second party an amount of the transaction, if a valid approval code is not associated with the STN.

4. The method of claim 2, further comprising the step of routing the transaction dispute to a predefined STN queue based at least in part on an industry type associated with the transaction.

5. The method of claim 1, wherein in response to the authorization of the transaction, the secondary transaction number (STN) is automatically requested, by the merchant via the processor.

6. The method of claim 1, wherein the account number is a non-currency based account.

7. The method of claim 1, wherein the account number is associated with an electronic line-of-credit system.

8. The method of claim 1, further comprising the step of receiving a dispute of a charge associated with the transaction and causing the charge to be charged back to the merchant.

9. The method of claim 2, wherein in response to authorization of the transaction, a STN is automatically generated, via the processor.

10. The method of claim 2, wherein the primary account number is a non-currency based account.

11. The method of claim 2, wherein the primary account number is associated with an electronic line-of-credit system.

12. A tangible computer-readable medium having stored thereon computer-executable instructions that, if executed by a processor, causes the processor to perform operations comprising:

receiving, by a merchant and via the processor, an account number of a user;

submitting, by the merchant and via the processor, the account number to a provider of the account number and requesting authorization of the transaction;

requesting, by the merchant and via the processor, that the provider return a secondary transaction number (STN) in lieu of returning the account number;

receiving, from the provider and via the processor, an authorization record referencing the STN;

issuing, via the processor, a settlement request associated with the transaction, wherein the settlement request includes the STN and does not include the account number;

maintaining, by the merchant and via the processor, a record of the transaction; and replacing the account number with the STN, wherein the record of the transaction includes the STN and the record of the transaction does not include the account number.

* * * * *